(12) United States Patent
Symes et al.

(10) Patent No.: US 10,609,408 B2
(45) Date of Patent: Mar. 31, 2020

(54) VIDEO DATA PROCESSING SYSTEM USING ENCODING INFORMATION DERIVED FROM A PREVIOUS FRAME IN A SEQUENCE OF VIDEO FRAMES

(71) Applicant: ARM Limited, Cambridge (GB)

(72) Inventors: Dominic Hugo Symes, Cambridge (GB); Stefan Johannes Frid, Lund (SE)

(73) Assignee: Arm Limited, Cambridge (GB)

( * ) Notice: Subject to any disclaimer, the term of this patent is extended or adjusted under 35 U.S.C. 154(b) by 300 days.

(21) Appl. No.: 15/443,179

(22) Filed: Feb. 27, 2017

(65) Prior Publication Data

US 2017/0272774 A1 Sep. 21, 2017

(30) Foreign Application Priority Data

Mar. 21, 2016 (GB) .................................. 1604751.6

(51) Int. Cl.
| | |
|---|---|
| *H04N 19/172* | (2014.01) |
| *H04N 19/176* | (2014.01) |
| *H04N 19/124* | (2014.01) |
| *H04N 19/52* | (2014.01) |
| *H04N 19/164* | (2014.01) |
| *H04N 19/184* | (2014.01) |

(52) U.S. Cl.
CPC ........... *H04N 19/52* (2014.11); *H04N 19/164* (2014.11); *H04N 19/172* (2014.11); *H04N 19/176* (2014.11); *H04N 19/184* (2014.11)

(58) Field of Classification Search
CPC .... H04N 19/52; H04N 19/184; H04N 19/164; H04N 19/172; H04N 19/176

USPC .......................................................... 375/240
See application file for complete search history.

(56) References Cited

U.S. PATENT DOCUMENTS

| | | | | |
|---|---|---|---|---|
| 9,967,577 | B2 * | 5/2018 | Wu ........................ | H04N 19/33 |
| 2006/0171456 | A1 | 8/2006 | Kwon | |
| 2013/0101019 | A1 * | 4/2013 | Wilkins ................ | H04N 19/10 |
| | | | | 375/240.02 |

OTHER PUBLICATIONS

Combined Search and Examination Report dated Sep. 21, 2016, GB Patent Application No. GB1604751.6.

(Continued)

*Primary Examiner* — Susan E. Hodges
(74) *Attorney, Agent, or Firm* — Vierra Magen Marcus LLP

(57) ABSTRACT

An apparatus for decoding a sequence of frames of encoded video data includes parsing circuitry configured to parse the encoded video image data for a frame to derive encoding information for each block of the frame. The apparatus also includes feedback circuitry configured to feed back, to the parsing circuitry, encoding information for a frame for use when parsing the encoded video image data of the next frame. The encoding information includes an encoding indicator for each block. When the encoding indicators were enabled when encoding the blocks of the frame, the encoding indicator fed back for a block is the encoding indicator that was used to encode that block. When the encoding indicators for the blocks of the frame were disabled when encoding the video image data for the frame, the encoding indicator fed back for a block is an encoding indicator derived from a previous frame.

23 Claims, 3 Drawing Sheets

(56) References Cited

OTHER PUBLICATIONS

Mukherjee, et al., "The latest open-source video coded VP9—An overview and preliminary results," 2013 Picture Coding Symposium (PCS), Dec. 2013, pp. 390-393.

* cited by examiner

VIDEO DATA PROCESSING SYSTEM USING ENCODING INFORMATION DERIVED FROM A PREVIOUS FRAME IN A SEQUENCE OF VIDEO FRAMES

BACKGROUND

The technology described herein relates to the processing of video data, and in particular to methods of and apparatus for encoding and decoding video image data.

Video image data (e.g. RGB or YUV values) is generally encoded and then decoded, e.g. after transmission in the format of an encoded bitstream, according to a predetermined video encoding format, such as VP9. Video encoding formats such as VP9 can enable a significant reduction in the file size of video image data without a significant visible loss of image quality.

In encoded video data, generally each video frame is divided into a plurality of blocks (typically rectangles) of pixels of the frame (in VP9 encoding the blocks may be different sizes within a given frame) and each block is encoded and then decoded individually. In "differential" video coding standards such as VP9, each block of pixels within the video image data is usually encoded with respect to other encoded data, e.g. a reference block from a reference frame (such as a corresponding encoded block of pixels in a reference frame). Each encoded data block would therefore usually comprise a vector value (the so-called "motion vector") pointing to the data for the reference frame and data (the "residual") describing the differences between the data encoded in the current data block and the reference encoded data. (This thereby allows the video data for the block of the (current) frame to be constructed from the encoded video data pointed to by the motion vector and the difference data describing the differences between that block and the block of the current video frame.)

The data block may then be encoded by, for example, transforming the residuals into a set of coefficients (e.g. using an approximate Discrete Cosine Transform (DCT)) which are then quantised. Within a bitstream of multiple frames and even within a frame of multiple blocks, the encoding may be performed in a number of different ways or according to a set of variable encoding parameters, e.g. depending on the video image data in each block or relative to the reference encoded data.

In order that the encoded data is decoded correctly, an encoding indicator (such as the so-called "segment ID" in VP9 encoding) may be associated with each block when it is encoded that indicates how the block was encoded, i.e. so that the decoder knows how to decode the encoded data. The encoding indicator (e.g. the segment ID having an integer value from 0 to 7 in VP9 encoding) typically provides a reference to a predefined set of parameter values (e.g. including a quantisation parameter, a loop filter strength, a skip indication, etc.) that was used when encoding the block in question. Thus, when a frame of video image data is encoded, a set of encoding indicators (e.g. segment IDs), e.g. one for each block, can be produced, e.g. in the form of an encoding indicator map (a "segment map"), so they may be retrieved and used when decoding the encoded frame.

In video coding standards such as VP9, the encoding information, such as the motion vectors and the encoding indicators, for a given frame in a sequence of frames being decoded (or encoded) may, as well as being used to decode (or encode) the current frame (the frame to which they relate), also be used to determine (when determining) the encoding information for the next frame in the sequence of video frames. Thus, this information for the current frame may need to be available when decoding (or encoding) the next frame in the sequence.

Furthermore, in VP9 encoding, for example, for any given frame, one of a number of encoding or decoding modes can be applied, e.g. on a per frame basis, that determine whether or not a new set of the encoding indicators (e.g. a segment map) is generated (when encoding) or provided (when decoding) for the frame in question, or, e.g., whether the encoding indicators for a previous frame are to be used for the frame in question, or whether no encoding indicators are to be generated/provided for the frame in question (e.g. they may be disabled for the frame). Therefore a usable set of encoding indicators may not always be encoded with each frame (e.g. no encoding indicators or a default set of encoding indicators may be provided instead).

The Applicants believe that there remains scope for improvements to methods of and apparatus for encoding and decoding video image data.

BRIEF DESCRIPTION OF THE DRAWINGS

A number of embodiments of the technology described herein will now be described by way of example only and with reference to the accompanying drawings, in which.

DETAILED DESCRIPTION

Figure 1:
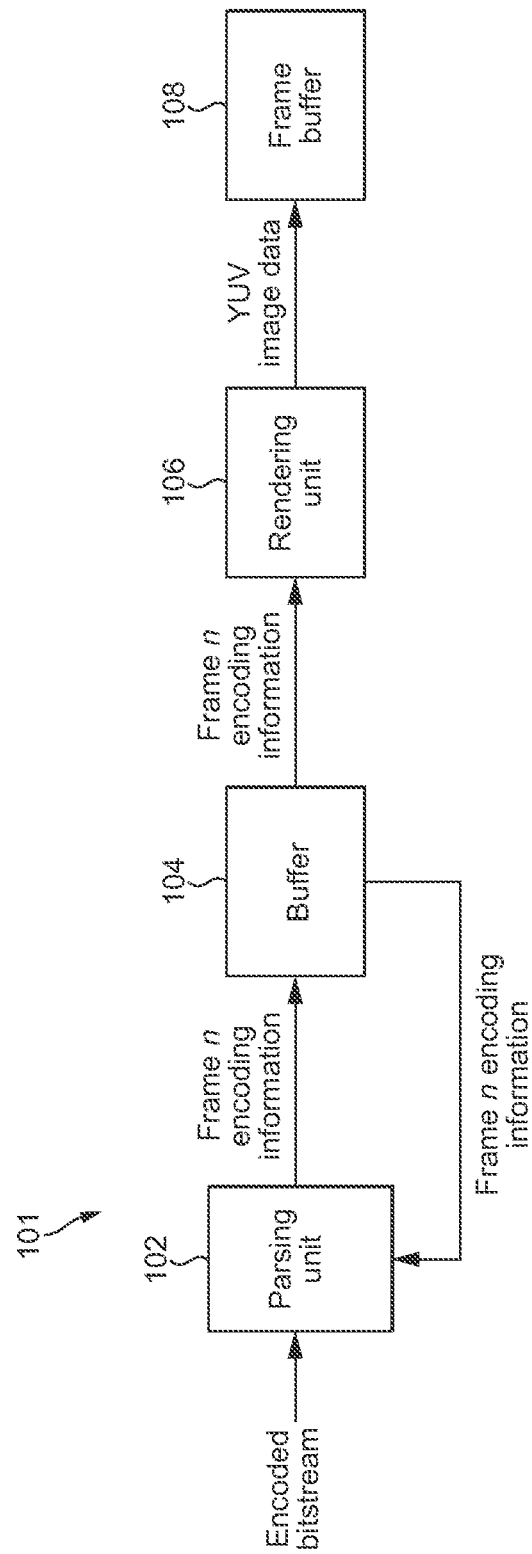
FIG. 1 shows a schematic of an apparatus for decoding encoded video image data to which the technology described herein can be applied.

In one embodiment the technology described herein comprises a method of decoding frames of a sequence of frames of video data, the sequence of frames of video data being provided as a bitstream of encoded video image data representing the sequence of frames of video data, the method comprising:

for a frame that the bitstream of encoded video image data represents:

parsing the encoded video image data for the frame to derive for each block that the video frame has been divided into for encoding purposes, a set of encoding information;

providing the encoding information derived from the encoded video image data for the frame for use to decode the encoded video image data for the frame to provide output video image data for the frame; and feeding back encoding information for the frame for use when parsing the encoded video image data of the next frame in the sequence of frames encoded in the bitstream;

wherein:

the feeding back of the encoding information for the frame comprises:

feeding back for each block of data that the video frame has been divided into for encoding purposes, at least an encoding indicator; wherein:

the feeding back of an encoding indicator for a block of the frame comprises:

when the encoding indicators for the blocks of the frame were disabled when encoding the video image data for the frame, feeding back an encoding indicator derived from the encoded video image data for a previous frame in the sequence of video frames for the block of the frame.

In another embodiment the technology described herein comprises an apparatus for decoding frames of a sequence of frames of video data that is provided as a bitstream of encoded video image data representing the sequence of frames of video data, the apparatus comprising:

processing circuitry configured to receive a bitstream of encoded video image data;

parsing processing circuitry configured to, for a frame that a bitstream of encoded video image data represents:

parse the encoded video image data for the frame to derive for each block that the video frame has been divided into for encoding purposes, a set of encoding information;

and provide the encoding information derived from the encoded video image data for the frame for use to decode the encoded video image data for the frame to provide output video image data for the frame;

and feedback circuitry configured to feed back, to the parsing processing circuitry, encoding information for a frame for use when parsing the encoded video image data of a next frame in a sequence of frames encoded in a received bitstream;

wherein:

the feedback circuitry is configured to feed back the encoding information for a frame by:

feeding back for each block of data that a video frame has been divided into for encoding purposes, at least an encoding indicator:

and to:

feed back an encoding indicator for a block of a frame by:

when the encoding indicators for the blocks of the frame were disabled when encoding the video image data for the frame, feeding back an encoding indicator derived from the encoded video image data for a previous frame in a sequence of video frames for the block of the frame.

In the technology described herein, a bitstream of encoded video image data is parsed to derive encoding information used when encoding the video image data, such as respective block sizes, motion vector values and encoding indicators (e.g. segment IDs), for use when decoding the encoded video image data to generate frames of video for output.

However, as well as providing that encoding information for use when decoding the encoded video image data of the frame in question, encoding information for a video frame that is currently being processed and decoded is also fed back for use when deriving the encoding information for the next video frame in the sequence. This facilitates then using the encoding information for the current video frame to derive the encoding information for the next video frame in the sequence (which, as discussed above, can be required in certain video coding standards, such as VP9).

Moreover, in the technology described herein, the encoding information that is fed back for use when deriving encoding information for the next frame in the sequence is configured to always include a set of encoding indicators for the blocks of the frame. This is achieved by feeding back as part of the encoding information that is fed back for the current frame, encoding indicators derived for a previous frame (when the encoding indicators were disabled when encoding the frame and thus not used to encode the frame). (When encoding indicators were enabled when encoding the blocks of the frame (and thus encoding indicators were used to encode the blocks of the frame) the encoding indicators fed back for use when deriving encoding information for the next frame are, in one embodiment, the encoding indicators that were used to encode the blocks of the frame.)

This then ensures that an appropriate set of encoding indicators is always available for use (if necessary) when deriving the encoding information for a subsequent frame in the sequence of frames, even in the case where, as discussed above, the encoding indicators may be disabled for some frames (and thus these frames may have a default set of encoding indicators associated (and encoded) with them), such that they are available in the case where, e.g., the encoding indicators from a previous frame may be required for a frame that follows a frame that has had its encoding indicators disabled.

In other words, the method and apparatus of the technology described herein feed back encoding indicators for each frame to be available at the parsing stage. This helps to ensure that even though encoding indicators may not be needed for the decoding of a particular frame and thus may be disabled in the encoded video image data for that frame, a set of encoding indicators can be provided for the plurality of blocks of data for that frame (i.e. using the encoding indicators for a previous frame), such that when a subsequent, encoded frame that relies upon the encoding indicators from a previous frame (which may happen, as discussed above) is encountered in the sequence of encoded frames, a set of encoding indicators is available for use when decoding that subsequent frame, regardless of the presence or otherwise of a meaningful (e.g. non-default) set of encoding indicators in the encoded video image data for the current frame.

Furthermore, feeding back encoding indicators and at least some of the other encoding information for every frame may enable the values fed back to be combined into a single stream of data which, particularly in a system where the video image data is continuously streamed and decoded, can help to minimise the complexity of the system, reduce memory storage and access requirements, etc. (and thereby, e.g., reduce power consumption, memory bandwidth, etc.). Thus, in an embodiment the encoding information fed back to the parsing stage is fed back in a single stream of data. Thus, in an embodiment, the step of feeding back encoding information for a frame comprises (and the feedback circuitry is arranged to): combining the encoding indicators and any other encoding information to be fed back for each block of data into a single stream of data and feeding back the encoding indicators and other encoding information for each block of data in the single stream of data.

Similarly, at least some of the encoding information provided (e.g. derived from parsing the encoded video image data) for use to decode the encoded video image data for the frame to provide output video image data for the frame may be provided, e.g. to the storage, in a single stream of data. Thus, in an embodiment, the step of providing the encoding information for use to decode the encoded video image data for the frame comprises (and the parsing processing circuitry is arranged to): combining the encoding indicators (when provided) and at least some of the other encoding information to be provided for each block of data into a single stream of data and providing the encoding indicators and the at least some of the other encoding information for each block of data in the single stream of data. In an embodiment some but not all of the encoding information provided for use to decode the encoded video image data for the frame to provide output video image data for the frame is provided in a single stream of data. For example the residuals for the blocks of the frame are, in an embodiment, provided in a separate stream of data.

The sequence of frames of video data that are provided and decoded in the technology described herein can be any suitable and desired sequence of video frames. There will be at least two frames in the sequence of video frames, but, in an embodiment, there are more than two frames in the sequence of video frames.

The sequence of frames are provided in the form of a bitstream of encoded video image data representing the sequence of frames of video data that is then decoded in the manner of the technology described herein to provide a sequence of output video frames, e.g., for the purposes of display.

The video frames are encoded in a blockwise fashion in the bitstream of encoded video image data, i.e. each video frame that is encoded is divided into respective blocks of pixels (sampling positions) representing respective regions (areas) of the video frame, which blocks are then respectively individually encoded within the encoded video image data bitstream (i.e. such that respective individual blocks can be identified and decoded from the encoded video image data).

The blocks of data that the video frames are subdivided into for the encoding process can be any suitable and desired blocks of the video frames. In one embodiment they are rectangular in shape, e.g. square. The rectangular blocks may take any suitable and desired size. In an embodiment the rectangular blocks each have a size between and including 8×8 pixels and 64×64 pixels, e.g. with each edge of the rectangular blocks having a size of 2n pixels, where n is an integer (e.g. between and including 3 and 6).

In an embodiment, a given frame may comprise blocks of plural different sizes, e.g. that tessellate over the area of the frame, and/or the size and number of the blocks may change between different frames, e.g. depending on the video image data of the frame.

The encoding process for encoding the video image data (and correspondingly the decoding process for decoding the encoded video image data) in the technology described herein uses, inter alia, a set of encoding information, that, in an embodiment, comprises a block size indication. In an embodiment the set of encoding information that may be (and is) used for a block also comprises one or more (and, e.g., both) of a motion vector and an encoding indicator (although these parameters may not be used (and encoded) for every frame in a sequence of video frames).

This encoding information can be provided in and represented in any suitable and desired manner, e.g. depending upon the requirements of the video coding standard being used.

In the case of the block size for example, that is, in an embodiment, indicated in terms of the pixels within the block, and, in an embodiment, indicates the size of the edges of the rectangular block.

The motion vector should indicate the difference in position of the data in the block that it relates to (is associated with) compared to a block of data in a reference frame (e.g., in the sequence of frames being decoded).

The encoding indicator for a block of data should indicate a particular, e.g. selected, e.g. predefined, set of values to be used for a particular, e.g. selected, e.g. predefined, set of encoding parameters that were used when encoding the block of data in question (and correspondingly that should be used when decoding the block of data in question). The set of parameters that the encoding indicator relates to may include any suitable and desired encoding parameters used to perform the encoding (and correspondingly needed to perform the decoding), e.g., depending upon the video coding standard being used. In an embodiment, the set of encoding parameters that the encoding indicator relates to comprises one or more of, e.g. all of: a quantisation parameter, a loop filter strength, a skip indication and a reference frame indicator.

The encoding indicator may indicate the values of the encoding parameters in the set of encoding parameters that were used when encoding the block in question, but, in an embodiment, the encoding indicator indicates the set of encoding parameters and with the values for these parameters being transmitted separately, e.g. in a frame "header" data word of the encoded video image data for the frame, so that the decoder knows how to decode the encoded data.

In an embodiment the encoding indicator indicates one of a plurality of sets of predefined encoding parameters. Thus, for example, the encoding indicator may indicate, for example, which one of four or eight different sets of predefined encoding parameters have been used.

In the case of VP9 encoding, the encoding indicator will be the segment ID, and will accordingly indicate a value between 0 and 7, indicating which of eight predefined sets of encoding parameters have been used when encoding the data block in question.

The technology described herein can be used for any form of video encoding that is a block-wise encoding process that uses encoding indicators. An example of such a video coding standard is VP9 (in which case the encoding indicator is, as discussed above, the segment ID). Thus, in an embodiment, the sequence of frames of video data have been encoded using VP9 encoding. However, other video encoding processes and standards that operate in a similar or corresponding way could be used, when desired, e.g. the VP8 video coding standard.

The parsing of the encoded video image data for a frame in the bitstream to derive a set of encoding information for each block that the video frame has been divided into for encoding purposes can be performed in any suitable and desired manner. This process should parse the encoded video image data to derive any encoding information in the encoded video image data for the frame block in question.

It may also, and in an embodiment does also, include using fed back encoding information from the previous frame in the bitstream to derive the encoding information for the frame that is currently being decoded (e.g. by combining that fed back encoding information appropriately with the encoding information derived from the frame that is currently being decoded (parsed)).

For example, the motion vector values for the blocks in the next frame may be derived using, inter alia, the block sizes for the plurality of blocks of data in the current frame that are fed back to the parsing stage. For example the block sizes may be used to determine how the motion vector values should be unpacked from the encoded bitstream. In an embodiment the motion vector values for the blocks in the next frame depend on the values of the unpacked motion vector values from the encoded bitstream at given relative spatial locations in the current frame.

The encoding information that is derived for each block that the video frame has been divided into for encoding purposes can be provided in any suitable and desired manner, e.g. depending upon the requirements of the video coding standard being used.

The encoding information that is derived for each block that the video frame has been divided into for encoding purposes comprises at least a block size indication for the block in question.

In an embodiment the block size is indicated in terms of the pixels within the block, and, in an embodiment, indicates the size of the edges of the rectangular block.

Where the encoded video image data for a frame includes a motion vector value for each block that the frame has been divided into for encoding purposes, in an embodiment the parsing of the encoded video image data for the frame also derives for each block that the video frame has been divided into for encoding purposes a motion vector value. In this case therefore, the set of encoding information that is derived for each block that the video frame has been divided into for encoding purposes will comprise a block size indication and a motion vector value for the block.

Typically, each frame (i.e. each "inter" frame) in the sequence of video frames being decoded that is encoded with respect to a reference frame will include encoded motion vector values (though such a frame may provide a reference for other frames, e.g. the following frame). Thus, in an embodiment, the parsing of the encoded video image data for an inter frame in the sequence of video frames being decoded comprises deriving for each block that the video frame has been divided into for encoding purposes a motion vector value for the block.

Correspondingly, where the encoded video image data does not include a motion vector value for each block of the video frame (e.g. an "intra" frame (also called a "key" frame in VP9)), the set of encoding information that is derived for each block that the frame has been divided into for encoding purposes will not include a motion vector value for the block (i.e. in an embodiment it comprises a block size indication and, when present, an encoding indicator for the block). The set of encoding information that is derived for each block that the frame has been divided into for encoding purposes may also comprise further information, e.g. the intra prediction mode.

The motion vector value should allow a motion vector which indicates the difference in position of the data in the block compared to a block of data in a reference frame (e.g., in the sequence of frames being decoded) to be determined. The motion vector value may, e.g., be, and in an embodiment is, in the form of a difference value that is, e.g., to be combined with a previous motion vector value or values to provide the motion vector in question.

Where the encoded video image data for a frame includes an encoding indicator for each block that the frame has been divided into for encoding purposes (and thus the encoding indicators were enabled when encoding the video image data for the frame), then, in an embodiment, the parsing of the encoded video image data for the frame also derives an encoding indicator for each block that the video frame has been divided into for encoding purposes (with, for example, the set of encoding indicators comprising two different encoding indicators for the frame). In this case therefore, the set of encoding information that is derived for a (and for each) block that the video frame has been divided into for encoding purposes will comprise a block size indication and an encoding indicator for the block (and, when present, a motion vector value for the block).

Correspondingly, where the encoding indicators for the blocks of a frame were disabled in the encoded video image data for the video frame, the set of encoding information that is derived for each block that the frame has been divided into for encoding purposes may not include an encoding indicator for the block (i.e. in an embodiment it comprises a block size indication, and, when present, a motion vector value for the block) or may comprise a default encoding indicator (e.g. having a value equal to 0) for the block. However, as discussed below, a set of encoding indicators fed back from (derived from) a previous frame may be provided in the encoding information for the frame being decoded, such that these may be fed back for a subsequent frame (for use to decode this subsequent frame should this be required).

Furthermore, where the encoded video image data refers to the encoding indicators for a previous frame in the bitstream (which, for example, were used to encode the video image data for the present frame) and thus the encoded video image data for the frame may not include a set of encoding indicators for the blocks, a set of encoding indicators fed back from (derived from) a previous frame may be provided in the encoding information for the frame being decoded, to be used for decoding the frame of encoded video image data and such that these encoding indicators may be fed back for a subsequent frame (for use to decode this subsequent frame should this be required). The previous frame that is referred to for the encoding indicators may be any suitable and desired frame. In an embodiment the encoding indicators referred to are those from the immediately previous frame for which encoding indicators were enabled when encoding the video image data.

The set of encoding information that is derived for each block of the frame can also comprise any other encoding information as is suitable and desired (e.g. depending upon the video coding standard being used). For example, the set of encoding information that is derived for each block that the frame has been divided into for encoding purposes may also comprise the intra prediction mode and/or the transform size.

The set of encoding information that is derived for each block of the frame by parsing the encoded video image data for the frame is provided for use to decode the encoded video image data for the frame. The set of encoding information that is provided in this regard for use to decode the encoded video image data should at least include the encoding information that is derived for the frame being decoded by the parsing operation. Thus, in an embodiment, this will comprise one or more (and, e.g., all) of: an encoding indicator (when not disabled), a block size indicator, and, when present, a motion vector value, for each block that the frame has been divided into for encoding purposes.

Where such an encoding indicator is encoded for each block of the frame (i.e. is present in the encoded video image data for the frame and, e.g., comprises two different encoding indicators for at least two respective blocks), then those encoding indicators that are derived for the frame being decoded should be and, in an embodiment, are provided for use to decode the encoded video image data for the frame.

Where encoding indicators for the frame have been disabled, and thus the encoded video image data for the frame may encode a default set of encoding indicators for the frame, then, in an embodiment, a set of encoding indicators fed back from (derived from) a previous frame are provided as the encoding indicators for the frame being decoded for use to decode the encoded video image data for the frame (if required). This then ensures that there is always a set of (non-default) encoding indicators available for feeding back for use by a subsequent frame (and/or for use when decoding a frame), even when the encoded video image data for the frame itself includes only a default set of encoding indicators for the frame (owing to the encoding indicators being disabled when encoding the video image data). However, as will be discussed below, the default set of encoding indicators may be provided for use when decoding the encoded video image data for the frame, to indicate that the blocks of the frame were encoded without the use of encoding indicators and thus may not require any encoding indicators to decode the encoded video image data for the frame.

In an embodiment, as well as providing the encoding indicators fed back from a previous frame, a default or predefined set of encoding parameter values (e.g. those associated with the default set of encoding indicators) may also be provided (e.g. in a "header" data word) for the frame being decoded for use to decode the encoded video image data for the frame. This allows these default or predefined parameter values to be used when decoding the frame (e.g. simply to indicate that no encoding indicators are to be used when decoding the encoded video image data for the frame) while providing the encoding indicators fed back from a previous frame, such that these are available for a subsequent frame (if required).

Where encoding indicators for the frame refer to the encoding indicators for a previous frame in the bitstream, then also, in an embodiment, a set of encoding indicators fed back from (derived from) a previous frame are provided as the encoding indicators for the frame being decoded for use to decode the encoded video image data for the frame, which are in turn available for feeding back for use by a subsequent frame (e.g. should the subsequent frame refer to these encoding indicators).

The encoding information that is provided for use to decode the encoded video image data for the frame to provide output video image data for the frame can be provided for use to decode the encoded video image data for the frame in any suitable and desired manner. Thus it may, e.g., be provided as a data stream (be streamed) to an appropriate decoder (decoding stage).

In an embodiment, the encoding information is stored such that it can then be read for use to decode the encoded video image data for the frame to provide output video image data for the frame.

Thus, in an embodiment, the process of providing the encoding information derived from the encoded video image data for the frame (and any additional encoding information) for use to decode the encoded video image data for the frame to provide output video image data for the frame comprises storing that encoding information such that it can then be retrieved for use to decode the encoded video image data for the frame. Correspondingly, in an embodiment the apparatus of the technology described herein comprises storage for storing the encoding information derived from the encoded video image data for the frame (and any additional encoding information) for use to decode the encoded video image data for the frame.

The storage, to which the encoding information for a frame is provided, may comprise any suitable and desired storage. In an embodiment the storage comprises a main memory. This allows the encoding information, which may be large in size, to be held before it is used to decode the encoded video data. In an embodiment the storage (e.g. the main memory) uses direct memory access (DMA), and thus also, in an embodiment, the apparatus comprises a DMA controller configured to control the read and write access to the storage. This, e.g. latency tolerant, memory access reduces the effect of the memory latency of reads and writes of the encoding information to and from the storage, particularly when the storage comprises the main memory.

When at least some of the encoding information is provided and/or fed back as a single stream of data this may also help to make the memory access, e.g. using DMA, more efficient. Other arrangements would, of course, be possible.

In an embodiment the provided encoding information is (then) used to decode the encoded video image data for the frame to provide an output frame, e.g., for display. This can be done, and can use the provided encoding information derived from the encoded video image data for the frame (and any additional encoding information), in any suitable and desired manner, e.g. according to and in dependence on, the video coding standard being used.

Thus, in an embodiment, the process of the technology described herein further comprises using the encoding information derived from the encoded video image data for the frame (or by reference to a previous frame) to decode the encoded video image data for the frame to provide output video image data for the frame. Correspondingly, in an embodiment the apparatus of the technology described herein comprises decoding processing circuitry operable to use the encoding information derived from the encoded video image data from the frame to decode the encoded video image data for the frame to provide output video image data for the frame.

The decoding process should use encoding information that is necessary for decoding the frame in question.

Thus, for example, where the encoded frame is to use an encoding indicator for each block that the frame has been divided into for encoding purposes, then a suitable set of encoding indicators will be used for the decoding process (and, in an embodiment, either a set of encoding indicators encoded with the frame in question, or a set of encoding indicators from a previous frame, as appropriate).

Thus, in the embodiment where the set of encoding information that is provided for use to decode the encoded video image data for the frame also includes a (e.g. non-default) encoding indicator for each block of the frame (e.g. where the encoding indicators were enabled when encoding the video image data for the frame and thus comprise, e.g. at least two different, encoding indicators), then where encoding indicators are to be used for the decoding operation, the decoding process will use the encoding indicators that are provided in the set of encoding information that is provided for use to decode the encoded video image data for the frame (which encoding indicators may be encoding indicators derived from the encoded video image data for the frame in question (being decoded) (where that encoded video image data includes encoding indicators for the frame), or they may be, as discussed above, encoding indicators provided from (and derived from) a previous frame in the sequence of frames).

Conversely, where the encoding indicators are disabled for the encoded frame (and thus, e.g., comprise a default set of encoding indicators), then, in an embodiment, encoding indicators will not be used when decoding the frame.

In the case where the encoding indicators were disabled for the encoded frame, then, in an embodiment, the fact that encoding indicators are not being used for the decoding of the frame can be handled in any desired and suitable manner, e.g. that is appropriate to the video coding standard being used. Thus for example, a default and/or predefined set of encoding parameter values could be used for decoding the encoded video image data of the frame where specific encoding indicators for the blocks of the frame are not indicated (to be used) (and in one embodiment this is what is done), e.g. by setting the encoding parameter values for the encoding indicators to the same value. This default and/or predefined set of encoding parameter values may be provided in a "header" data word associated with the frame.

The need or otherwise to use encoding indicators when decoding the encoded video data for a frame can be indicated and determined in any suitable and desired manner, e.g. depending on, and in accordance with, the video coding process (e.g. standard) that is being used. The need not to use encoding indicators may be indicated by a default and/or predefined set of encoding parameter values (e.g. with all the blocks of the frame having the same, e.g. default, value (e.g. 0) for each parameter), e.g. provided in a "header" data word associated with the frame. Thus, vice versa, the need to use encoding indicators when decoding the encoded video data for a frame may be indicated by the presence of a non-default set of encoding parameter values (e.g. comprising two different parameter values), again, e.g., provided in a "header" data word associated with the frame.

However, in an embodiment, the need or otherwise to use encoding indicators when decoding the encoded video image data for a frame is indicated by a mode indicator that is encoded in the video image data for the frame, e.g. provided in "header" data (a frame header) associated with the frame. In an embodiment the mode indicator indicates one of three encoding modes, namely: i) that the use of encoding indicators was enabled when encoding the video image data and the encoding indicators to use are encoded in the bitstream for the frame (e.g. owing to the encoding indicators having been updated for the present frame); ii) that the use of encoding indicators was enabled when encoding the video image data for the frame, but using encoding indicators for a previous frame (e.g. owing to the encoding indicators not having been updated for the present frame; in this case, in an embodiment, no encoding indicators are encoded in the bitstream for the frame); and iii) that the use of encoding indicators was disabled when encoding the video image data for the frame (and thus no encoding indicators are to be used when decoding the encoded video data for the frame).

Thus it will be appreciated that there are three main modes that are used when encoding and decoding the video image data for the frame. In a first mode, the encoding indicators (e.g. the segment map) are enabled, having been updated for this frame, when encoding the video image data for the frame. In this mode, the encoding indicators are encoded in the video image data for the frame and thus provided for decoding the frame.

In a second mode, the encoding indicators are enabled when encoding the video image data for the frame, but have not been updated for this frame, so reference and use for the encoding of video image data for the present frame the encoding indicators from a previous frame. In this mode, the encoding indicators are, in an embodiment, not encoded in the video image data for the frame but rather a reference (e.g. the mode indicator) to a previous frame is encoded in the bitstream for the frame, e.g. in header data associated with the frame, such that the set of encoding indicators from the previous frame (e.g. having been fed back from a previous frame) can be provided for decoding the frame.

In a third mode, the encoding indicators are disabled when encoding the video image data for the frame. In this mode, in an embodiment a default set of encoding indicators are encoded in the video image data for the frame (e.g. to indicate that the encoding indicators were disabled when encoding the video image data), but, in an embodiment, no encoding indicators are used to decode the encoded video image data (e.g. owing to no encoding indicators having been used to encode the video image data).

Thus, in an embodiment, the encoding information derived (by the parsing stage) from the encoded video image data for the frame comprises a mode indicator (that indicates whether or not encoding indicators were enabled for the frame when encoding the video image data and, when they were enabled, whether the encoding indicators were updated for the frame or the encoding indicators from a previous frame were used), which is, in an embodiment, then provided for use to decode the encoded video image data for the frame.

It will further be appreciated that the above three modes split into two categories: either the encoding indicators for the current frame are fed back (when the encoding indicators were enabled when encoding the video image data for the blocks of the frame and the set of encoding indicators was updated for the frame) or the encoding indicators for a previous frame are fed back (either when the encoding indicators were disabled when encoding the video image data or when the encoding indicators used to encode the video image data are those used (and thus referenced) from a previous frame).

Thus, in an embodiment, when the encoding indicators were enabled when encoding the video image data for the blocks of the frame and the set of encoding indicators was updated for the frame (and thus, in an embodiment, the encoded video image data for the frame included an encoding indicator for each block of the frame (e.g. with at least two encoding indicators for at least two respective blocks having different values)) the feeding back of an encoding indicator for a block of the frame comprises feeding back the encoding indicator for the block of the frame that was derived from the encoded video image data for the frame.

Also, in an embodiment, when the encoding indicators were not updated for the frame the feeding back of an encoding indicator for a block of the frame comprises feeding back an encoding indicator derived from the encoded video image data for a previous frame in a sequence of video frames for the block of the frame. In an embodiment the encoding indicators are not updated owing to the encoding indicators either being disabled or referring to encoding indicators from a previous frame when encoding the video image data.

As well as providing the necessary encoding information for use to decode the encoded video image data for a frame in the sequence of frames, as discussed above, encoding information derived from the encoded video image data for a frame in the sequence of frames is also fed back for use when parsing the encoded video image data of the next frame in the sequence of frames encoded in the bitstream.

The encoding information that is fed back in this regard comprises at least an encoding indicator for each block of data that the current video frame (i.e. that has just been parsed) has been divided into for encoding purposes.

In an embodiment the encoding information that is fed back also comprises any other encoding information that has been derived from the encoded video image data for the frame. Thus, in an embodiment, it also comprises a block size indication and/or a motion vector value for each block that the frame has been divided into for encoding purposes (where present).

In an embodiment the encoding information to be fed back is fed back to the parsing stage in a single stream of data. This may be done in any suitable and desired way. For example, there could be a feedback path from the output of the parsing stage that feeds the encoding information back to the input of the parsing stage. In the embodiment where the encoding information is provided to storage (e.g. main memory) for use to then decode the encoded video data for the frame, then in an embodiment, the encoding information is fed back to the parsing stage from the storage. Other arrangements would, of course, be possible.

In an embodiment, the data stream that is fed back comprises a sequence of, e.g. fixed size, data words, e.g. 32-bit words, into which the encoding information (e.g. block size indicators, encoding indicators and/or motion vector values) for the blocks of the frame are written. The various encoding information values can be configured and fitted into the data words in the data stream in any suitable and desired manner, e.g., depending upon their sizes relative to the size of the data words.

In an embodiment a fixed number of bits within each (e.g. fixed length) data word is provided for each of the encoding information values. For example, each data word can include plural, e.g. four, fields for providing encoding information values.

When more encoding information than can be provided by the relevant field(s) in one data word is to be fed back for a block, then, in an embodiment, that is done by using one or more additional data words for the block in question (as appropriate). In this case, in an embodiment, the first data word for the block includes an indication (e.g. a flag) to indicate that further information for the block is included in an additional data word (or words). In other words when more than one data word is needed to provide the fed back encoding information for a block, additional data words are, in an embodiment, provided along with the initial data word for the block. This is discussed further below.

It will be appreciated in this regard that the data stream will include a set of encoding information for each data (pixel) block that the video frame has been divided into for encoding purposes. Thus the data stream will comprise, for example a sequence of data words for each frame, with there being one or more data words including the encoding information for a first block of the frame, followed by one or more other data words containing the encoding information for the next block in the frame, followed by one or more further data words containing the encoding information for the next block in the frame, and so on.

The fed back encoding information for the blocks of the frame should be provided in the data stream in the appropriate order, e.g., in the order that the blocks were encoded in the encoded video image data (i.e. in the processing order for the blocks that the video frame has been divided into).

Correspondingly, the data words, e.g. in a stream of data, containing the encoding information from one frame will be followed by further data words, e.g. in a stream, containing the encoding information for the next frame in the sequence of frames, and so on. When feeding back the encoding information for the blocks of the frame, in an embodiment the frame is divided into a plurality of strips, each strip comprising the encoding information for a plurality of blocks. The encoding information in one or more strips may be fed back in a (e.g. continuous) stream of data. Thus the encoding information for a frame may be fed back in a plurality of streams of data (with each stream comprising one or more strips), e.g. one after each other. The division(s) between the streams of data may be the frame boundary or the end of a strip, as is suitable and desired.

As discussed above, for each block of data that the video frame has been divided into, at least an encoding indicator (and, in an embodiment, a block size indicator and a motion vector value) are fed back to the parsing stage. So far as the motion vector value (where provided) and block size indication are concerned, then as the encoded video image data for the frame will contain such values for each block in the frame, the fed back values for a given data block may, and in an embodiment do, simply correspond to the values derived from the encoded video image data for the frame for the block in question.

However, as discussed above, in the case of encoding indicators for the blocks of data in the frame, the encoding indicators may have been disabled when the video image data for a frame was being encoded. Thus, the arrangement for feeding back an encoding indicator for each block of data that a video frame has been divided into for encoding purposes is configured to allow for this, and, in an preferred, either feeds back an encoding indicator for the block of the frame that was derived from the encoded video image data for the frame (in the case where the encoded video image data for the frame included a (non-default) encoding indicator for each block of the frame, where, e.g., two encoding indicators for blocks in the frame are different, owing to the encoding indicators having been enabled when encoding the video image data for the frame and thus encoded in the bitstream for the frame), or feeds back an encoding indicator derived from the encoded video image data for a previous frame in the sequence of frames for a block of the frame (in the case where the encoding indicators were disabled when encoding the video image data for the frame and, in an embodiment, also when the encoded video image data for the frame refers to the encoding indicators from the previous frame, in an embodiment these encoding indicators having been used to encode the video image data for the frame).

In other words, in an embodiment, when the encoding indicators were enabled when encoding the video image data for the frame and these encoding indicators were encoded with the encoded video image data (e.g. owing to the encoding indicators having been updated for the frame), i.e. when the encoded video image data for the frame included an encoding indicator for each block of the frame, with, e.g., at least two encoding indicators for at least two respective blocks having different values, the encoding indicators fed back for the blocks of the frame are those derived from the encoded video image data for the frame and otherwise (e.g. owing to the encoding indicators having been disabled when the video image data for the frame was encoded or to the encoding indicators having been enabled but referring to the encoding indicators from a previous frame, and thus, for example, when the encoded video image data for the frame did not include two different encoding indicators in the set of encoding indicators for the blocks of the frame) the encoding indicators fed back for the blocks of the frame are those derived from the encoded video image data for a previous frame in the sequence of frames.

In an embodiment, when the encoded video image data for the frame refers to the encoding indicators from a previous frame, the feeding back of an encoding indicator for a block of the frame comprises, feeding back an encoding indicator derived from the encoded video image data for a previous frame in the sequence of video frames for the block of the frame.

As with the encoding indicators to use (or not) when decoding the encoded video image data for a frame, the encoding indicators to be fed back may be indicated and determined in any suitable and desired manner. In an embodiment, the set of encoding indicators to feed back for a frame is indicated by a mode indicator that is encoded in the video image data for the frame, e.g. provided in header data associated with the frame. Thus in an embodiment, as above, the mode indicator indicates when the encoding indicators were enabled when encoding the video image data and these encoding indicators were encoded in the bitstream for the frame (e.g. when the encoding indicators were updated), when the encoding indicators were enabled (i.e. used) when encoding the video image data for the frame but with reference to the encoding indicators for a previous frame (e.g. when the encoding indicators were not updated and thus a set from a previous frame used) or when the encoding indicators were disabled when encoding the video image data for the data.

In the case where the encoded video image data for the frame being parsed and decoded included a (non-default) encoding indicator for each block of the frame (e.g. owing to the encoding indicators having been enabled when encoding the video image data for the frame and the encoding indicators having been updated for the frame), there will be in the encoded video image data for the frame an encoding indicator value for each block in the frame (with, e.g., at least two encoding indicators for at least two respective blocks having different values), so each block can simply have its respective encoding indicator "fed back" for it.

In this case therefore there will be a single encoding indicator provided for each block of data in the frame, being the encoding indicator that was included for that block in the encoded video image data for the frame.

In the case where the encoding indicators were disabled when encoding the video image data for the blocks of the frame being parsed and decoded (and, in an embodiment, also in the case where the encoded video image data for the frame refers to the encoding indicators from the previous frame), then, as discussed above, encoding indicators derived from the encoded image data for a previous frame in the sequence of video frames for the block of the frame will be used to provide the encoding indicators for each block of the current frame that are fed back to the parsing stage.

It should be noted in this regard that the previous frame whose encoding indicators are used (are fed back) may be the immediately preceding frame in the sequence of video frames, but need not be, and could be an earlier frame in the sequence of video frames (e.g. where there are intervening frames of the sequence that do not use encoding indicators and/or for which the use of encoding indicators has been disabled). When the encoded video image data for the frame refers to the encoding indicators from the previous frame, in an embodiment, the encoding indicators referred to are those from the immediately previous frame for which encoding indicators were enabled when encoding the video image data.

The encoding indicators for the previous frame that are to be used (fed back) in this regard can be provided in any suitable and desired manner. For example, where the encoding information is provided to the storage (e.g. main memory) after the parsing stage, then the encoding indicators for a previous frame could be maintained in the storage after the frame to which they relate has been decoded, so that they are then available for feeding back when required for a later frame.

In an embodiment where, as discussed above, the encoding information that is provided for use to decode an encoded video frame (e.g. that is stored in the storage (e.g. main memory)) includes a set of encoding indicators irrespective of whether the frame currently being parsed included a set of (non-default) encoding indicators, then those encoding indicators provided with the encoding information derived from the frame currently being processed can be, and in an embodiment are, fed back as the encoding indicators from the previous frame.

In other words, the encoding indicators for the previous frame will in effect be provided for feeding back to the parsing stage by the parsing stage including the fed back encoding indicators that it has received (from being fed back for a previous frame) in the encoding information that it outputs (where the encoded video data for the frame in question did not include a new set of (non-default) encoding indicators), such that those previous encoding indicators are then available to be fed back to the parsing stage again (and are fed back to the parsing stage again).

Thus, the "current" set of encoding indicators will, in effect, be continually looped round the parsing stage, e.g. via the storage, so that they are always available by being output from the parsing stage and fed back to the parsing stage (until an encoded video frame that includes a new set of (non-default) encoding indicators appears in the sequence of video frames, in which case that new set of encoding indicators will then become the "current" set of encoding indicators that are to be used).

In one embodiment the bitstream of frames of encoded video image data may be arranged into groups of frames that are able to be decoded independently. In an embodiment the first frame in the sequence of each group of frames is an "intra" frame (or "key" frame in VP9). The intra frame is not encoded with respect to any other, e.g. reference, frame and thus is able to be decoded independently of any other frame. In this embodiment, the looping round of the current set of encoding indicators back to the parsing stage may stop when an intra frame is encountered in the bitstream and then may be resumed for the new group of frames having the intra frame at the start, e.g. encoding indicators are not carried forward from a previous frame to the intra frame (or indeed for any subsequent frame).

Thus, in an embodiment:

when the encoding indicators were enabled when encoding the video image data for the frame and these encoding indicators were encoded with the encoded video image data (e.g. owing to the encoding indicators having been updated for the frame), i.e. when the bitstream of encoded video image data for a frame included a (non-default) encoding indicator for each block of the frame (with the encoding indicators for the frame comprising, e.g., two different encoding indicators), the set of encoding information derived for each block comprises the encoding indicator for the block of the frame currently being processed (which is then provided with the encoding information for the frame for use to decode the encoded video image data for the frame and fed back, to the parsing processing circuitry, for use when parsing the encoded video image data of the next frame); and when the encoding indicators were disabled when encoding the video image data (and thus, e.g., the bitstream of encoded video image data for a frame included a default encoding indicator for each block of the frame), the set of encoding information provided for each block comprises an encoding indicator derived from the encoded video image data for a block of a previous frame in the sequence of video frames (which is provided with the derived encoding information for the frame for use to decode the encoded video image data for the frame (if required), and fed back, to the parsing processing circuitry, for use when parsing the encoded video image data of the next frame).

Also, in an embodiment, when the encoded video image data for the frame refers to the encoding indicators from the previous frame, the set of encoding information provided for each block comprises an encoding indicator derived from the encoded video image data for a block of a previous frame in the sequence of video frames (which is provided with the derived encoding information for the frame for use to decode the encoded video image data for the frame, and fed back, to the parsing processing circuitry, for use when parsing the encoded video image data of the next frame).

Correspondingly, in an embodiment when the encoding indicators were enabled when encoding the video image data for the frame and these encoding indicators were encoded with the encoded video image data (e.g. owing to the encoding indicators having been updated for the frame), e.g. when the bitstream of encoded video image data for a frame includes a (non-default) encoding indicator for each block of the frame (e.g. with the encoding indicators for the frame comprising two different encoding indicators), that set of encoding indicators is provided in and fed back for the encoding information for the next and subsequent frames in the sequence of frames encoded in the bitstream until a new frame having encoding indicators enabled when encoding the video image data for the frame and having these encoding indicators encoded with the encoded video image data (e.g. a new frame that includes a (non-default) encoding indicator for each block of the frame) appears in the sequence of frames (at which point the set of encoding indicators for that new frame is provided in and fed back for the encoding information for the next and subsequent frames in the sequence of frames encoded in the bitstream until a new frame having encoding indicators enabled when encoding the video image data for the frame and having these encoding indicators encoded with the encoded video image data (e.g. a new frame that includes a (non-default) encoding indicator for each block of the frame) appears in the sequence of frames, and so on).

The Applicants have further recognised that it could be the case that the blocks that the current video frame has been divided into for encoding purposes may not match (in position and/or size) the blocks that the previous frame whose encoding indicator values are to be used was divided into for encoding purposes, i.e. there may not be an exact match between the blocks of the current frame and the blocks of the frame or frames from which the encoding indicators that are to be fed back will be taken.

To allow for this therefore, the operation in the manner of the technology described herein is operable to determine the encoding indicator derived from the encoded video image data for a previous frame to be fed back for a respective block of the current frame (where that is to be done) by mapping the block of the current frame to the corresponding block or blocks (i.e. having (at least in part) the same position within the frame) of the previous frame that the encoding indicators are to be taken from, and then selecting the encoding indicator to feed back for the current frame block accordingly.

In an embodiment, this process operates to identify a single encoding indicator from the previous frame to be fed back as an encoding indicator for the current block in the frame.

In an embodiment, this process operates as follows.

Firstly, where the block in the current frame either maps directly to a block in the previous frame that the encoding indicators are being taken from, or falls completely within a larger block in the previous frame, then the value for the corresponding block or larger block in the previous frame is provided as an encoding indicator for the current block in the frame.

On the other hand, in the case where the block in the current frame overlaps (at least in part) a number of blocks (each having respective encoding indicators) in the previous frame, then, in an embodiment, the encoding indicator for one of the blocks in the previous frame that the current frame block overlaps is selected and provided as an encoding indicator for the block in the current frame.

The encoding indicator that is selected (and/or the block in the previous frame whose encoding indicator is selected) for this purpose can be selected as desired. In an embodiment the lowest value encoding indicator of the set of blocks that the block in the current frame overlaps (at least in part) is selected as an encoding indicator to feed back for the current frame block. Other arrangements would, of course, be possible.

Thus, in an embodiment, where the encoding indicators derived from the encoded video image data of a previous frame of the sequence of frames are to be fed back for the blocks of the current frame, a single encoding indicator value from the previous frame in the sequence of video frames for the block of the frame is selected as an encoding indicator to be fed back for a given block of the (current) frame (e.g. in the manner discussed above).

This said, while, as discussed above, in these circumstances, in an embodiment, a single encoding indicator taken from the encoding indicators derived from a previous frame of the sequence of frames is fed back for each block of the current frame, the Applicants have further recognised that where a block of data in the current frame corresponds to a plurality of blocks of data in the previous frame from which encoding indicators are being taken (e.g. when the blocks of data in the previous frame are smaller than or partially overlap with the blocks of data in the current frame), then it would be advantageous to also include (and feed back) the encoding indicators for all the plurality of blocks of data in the previous frame that the block of data in the current frame corresponds to (i.e. at least partially overlaps) in the data stream, in addition to the single encoding indicator that has been selected for use for the block in the current frame.

This then allows that additional previous frame encoding indicator information to be maintained in the data stream, such that should a subsequent frame require the encoding information at a finer resolution than the block of data in the current frame (e.g. because blocks of data in that subsequent frame are smaller again), that finer resolution encoding indicator information can then be reconstructed (as the finer resolution encoding indicator information is still present in the fed back data stream).

Thus, in an embodiment, when a block of data in the current frame corresponds to a plurality of blocks of data in the previous frame from which the encoding indicators are being taken (e.g. when the blocks of data in the previous frame are smaller than or partially overlap with the block of data in the current frame) the plurality of encoding indicators for the plurality of blocks of data in the previous frame from which the encoding indicators are being taken are also fed back in respect of (are associated with) the block of data in the current frame.

Thus, when a block of data in the current frame corresponds to a plurality of blocks of data in a previous frame from which the encoding indicators are being taken, in an embodiment the encoding indicator information provided (and fed back) for the block of data in the current frame comprises both a single value representative of the encoding indicators (e.g. the minimum of the encoding indicators) in the corresponding blocks of data in the previous frame from which the encoding indicators are being taken (i.e. at a coarse resolution), and the plurality of encoding indicators for the plurality of blocks of data in the previous frame from which the encoding indicators are being taken that correspond to the block of data in the current frame (i.e. at a finer resolution).

This helps to avoid the finer resolution encoding indicator information from the previous frame being lost, e.g. because of a frame that is formed from coarser blocks of data and for which this information may otherwise have been discarded. This thus allows a subsequent frame, e.g. which may have a plurality of blocks of data at a resolution which better matches the blocks of data in the previous frame from which the encoding indicators were originally taken, to use the finer resolution encoding indicators for its blocks (rather than that information being lost).

Where a set of additional, finer resolution encoding indicators are to be fed back for a block of the frame, then those encoding indicators can be fed back in any suitable and desired format. In an embodiment they are provided in data words in the fed back data stream, e.g. using, when necessary, additional data words for the block of data in the current frame in question, e.g. further to the data word in which the selected single encoding indicator for that block may be written. Thus, when this further information is to be included in the data stream, in an embodiment extra data words are able to be included in the data stream at the appropriate point to accommodate it.

In an embodiment, the presence of any additional data words in the data stream is indicated. In an embodiment this is done by using an indicator, such as a flag, to indicate that additional data words (and/or the encoding indicators at a finer level of resolution) are present in the data stream for a data block. In an embodiment the indicator is included in the first data word in the stream for the block in question.

In an embodiment, whenever a set of additional, finer resolution encoding indicators are to be fed back for a block of the frame, then those encoding indicators are fed back using one or more additional data words in the data stream for the data block (e.g. together with setting a flag in the initial data word for the block in question to indicate the presence of the additional data word or words).

In an embodiment the number of additional data words that are used for the additional encoding indicators is dependent on the size of the block of data in the current frame (and thus the maximum number of smaller blocks in the previous frame that are covered by the current block), and/or the number of encoding indicators that a given data word can indicate.

For example, when the block of data in the current frame only covers up to the number of smaller blocks for which encoding indicators could be conveyed in a single additional data word, then, in an embodiment, only a single additional data word is used to provide the set of additional, finer resolution encoding indicators.

This will be the case, for example, where the minimum size of blocks the frames are divided into is 8×8 pixels, a given (e.g. 32-bit) data word can support up to eight encoding indicators, and the block of data in the current frame is smaller than 32×32 pixels.

In the case where the block of data in the current frame covers more than the number of smaller blocks in the previous frame for which encoding indicators can be conveyed using a single data word, then, in an embodiment, a plurality of additional data words are used to provide the set of additional, finer resolution encoding indicators. This would be the case in the above example where the block of data in the current frame is 32×32 pixels or larger.

In this case, in an embodiment, the additional data words are configured as follows. First, in an embodiment, there is a "header" data word having respective encoding indicator fields that each represent a respective set of smaller blocks within the block of the current frame (such as each representing a 32×16 block that corresponds to a set of eight 8×8 blocks). Then, when each smaller block within the set of smaller blocks represented by a given encoding indicator field of the header data word all have the same encoding indicator, then, in an embodiment, the field in the header data word for that set of smaller blocks is set to that encoding indicator value and is interpreted as indicating that all smaller blocks within that set of smaller blocks have that encoding indicator value.

On the other hand, when the smaller blocks within the set of smaller blocks that the encoding indicator field in the header data word corresponds to have different encoding indicator values, then, in an embodiment, the encoding indicator field for that set of smaller blocks in the header data word is set to a value that indicates that (e.g., to a predefined value that indicates that the smaller data blocks may have different data values), and then a further additional data word is included in the data stream which specifies the encoding indicator values for each smaller block within the set of smaller blocks that the encoding indicator field in the header data word corresponds to.

The use of a flag or other indication to indicate that encoding indicators are additionally provided at a finer resolution for a data block in the data stream, and the inclusion of those finer resolution encoding indicators by providing additional data words in the data stream, provides a particularly efficient mechanism for providing the encoding indicators at a finer level of resolution in the data stream when required, and can avoid, for example, the need to simply always provide and feed back a set of encoding indicators at the finest potential resolution of blocks that a video frame could have been divided into for encoding purposes. This also facilitates straightforwardly providing the finer level resolution encoding indicator information only where that is required, rather than always providing the finer level of resolution encoding information across the entire frame.

Where a finer resolution set of encoding indicators are being provided for a block of data in the current frame in this manner, those encoding indicators are, in an embodiment, provided (and included in the feedback data stream) in raster scan order. In an embodiment the finest resolution at which the encoding indicators are provided is a block of 8×8 pixels (sampling positions).

In an embodiment the processes of parsing the encoded video data, providing the derived encoding information for use to decode the encoded video data (and decoding the encoded video data), and feeding back the encoding information from a frame for use when parsing the encoded video data for the next frame in the sequence is repeated (appropriately) for each frame in the sequence of frames.

It will be appreciated in this regard, that the encoding information that is derived from and/or used to decode respective successive frames in the sequence of frames being decoded, and, correspondingly, that is fed back for use when parsing the encoded video data for the next frame in the sequence of frames, will vary in dependence upon what encoding information is encoded with a given frame in the sequence (e.g., and in particular, on whether an encoded frame includes a set of encoding indicators or not, whether the use of encoding indicators is enabled or disabled for a frame, whether an encoded frame refers to the set of encoding indicators in a different frame, etc.).

To illustrate this, the parsing of a couple of example sequences of frames of encoded video image data in the manner of an embodiment of the technology described herein will now be described.

First, consider a bitstream of encoded video image data representing a sequence of successive frames of encoded video image data, that are received by the processing circuitry for decoding, having a first frame for which (e.g. an updated set of) the encoding indicators were enabled when encoding the video image data for the frame and that included a (non-default) encoding indicator for each block of the frame (e.g. with the encoding indicators for the blocks in the frame comprising two different encoding indicators), a second frame for which the encoding indicators were disabled when encoding the video image data for the frame and a third frame for which the encoding indicators refer to the set of encoding indicators from a previous frame (i.e. the video image data for the third frame was encoded using the encoding indicators from a previous frame).

In this embodiment, the method comprises (and the apparatus is configured to), for a sequence of three successive frames of encoded video image data:

parsing the encoded video image data for the first frame to derive, from this data for each block that the first frame has been divided into for encoding purposes, an encoding indicator for the block;

providing the encoding indicator derived from the encoded video image data for the first frame for use to decode the encoded video image data for the first frame to provide output video image data for the first frame;

feeding back the encoding indicator derived from the encoded video image data for the first frame for use when parsing the encoded video image data of the second frame encoded in the bitstream;

parsing the encoded video image data for the second frame and providing the encoding indicator derived from the encoded video image data for the first frame for use to decode the encoded video image data for the second frame to provide output video image data for the second frame;

feeding back the encoding indicator derived from the encoded video image data for the first frame for use when parsing the encoded video image data of the third frame encoded in the bitstream; and parsing the encoded video image data for the third frame and providing the encoding indicator derived from the encoded video image data for the first frame for use to decode the encoded video image data for the third frame to provide output video image data for the third frame.

It will be seen, in this example, that even when a set of encoding indicators is not required in order to decode the encoded video image data of the second frame, the set of encoding indicators for the first frame are provided as part of the encoding information for the second frame (i.e. the set of encoding indicators derived for the second frame is the set of encoding indicators for the first frame) and then fed back for use when parsing the encoded video image data of the third frame (owing to the encoding indicators having been disabled for the second frame), in the event that the decoding of the encoded video image data of the third frame requires a set of encoding indicators from a previous frame (again, in the absence of a set of encoding indicators being available in the encoded video image data for the third frame, i.e. because the third frame was encoded using the encoding indicators from a previous frame (i.e. the encoding indicators fed back from the first frame)).

Second, consider a bitstream of encoded video image data representing a sequence of successive frames of encoded video image data, that are received by the processing circuitry for decoding, having a first frame for which (e.g. an updated set of) the encoding indicators were enabled when encoding the video image data for the frame and that included a (non-default) encoding indicator for each block of the frame, a second frame for which the encoding indicators were disabled when encoding the video image data for the frame and a third frame for which (e.g. an updated set of) the encoding indicators were enabled when encoding the video image data for the frame and that did include a (non-default) encoding indicator for each block of the frame.

In this embodiment, the method comprises (and the apparatus is configured to), for a sequence of three successive frames of encoded video image data:

parsing the encoded video image data for the first frame to derive, from this data for each block that the first frame has been divided into for encoding purposes, an encoding indicator for the block;

providing the encoding indicator derived from the encoded video image data for the first frame for use to decode the encoded video image data for the first frame to provide output video image data for the first frame;

feeding back the encoding indicator derived from the encoded video image data for the first frame for use when parsing the encoded video image data of the second frame encoded in the bitstream;

parsing the encoded video image data for the second frame and providing the encoding indicator derived from the encoded video image data for the first frame for use to decode the encoded video image data for the second frame to provide output video image data for the second frame;

feeding back the encoding indicator derived from the encoded video image data for the first frame for use when parsing the encoded video image data of the third frame encoded in the bitstream;

parsing the encoded video image data for the third frame to derive, from this data for each block that the third frame has been divided into for encoding purposes, an encoding indicator for the block; and providing the encoding indicator derived from the encoded video image data for the third frame for use to decode the encoded video image data for the third frame to provide output video image data for the third frame (and, in an embodiment, feeding back the encoding indicator derived from the encoded video image data for the third frame for use when parsing the encoded video image data of the next frame encoded in the bitstream).

In this example, it can be seen that the encoding indicators for the first frame are fed back to the parsing stage (owing to the encoding indicators having been disabled for the second frame) until a frame of encoded video image data is received in the bitstream (i.e. the third frame) that included a set of (non-default) encoding indicators. When such a frame (the third frame) is received, the encoding indicators provided for decoding the encoded video image data (and then fed back for parsing of a subsequent frame) is then the set of encoding indicators of that later (i.e. the third) frame.

Although the technology described herein has been described above with particular reference to the decoding of video data, the Applicant has appreciated that the techniques of the technology described herein may also be used when encoding video image data.

Thus, in one embodiment the technology described herein comprises a method of encoding frames of a sequence of frames of video data, the sequence of frames of video data being provided as a bitstream of video image data representing the sequence of frames of video data, the method comprising:

for a frame that the bitstream of video image data represents:

processing the video image data for the frame to divide the video frame into blocks for encoding purposes, and to derive for each block that the video frame has been divided into for encoding purposes, a set of encoding information;

providing the encoding information derived for the video image data for the frame for use to encode the video image data for the frame to provide output encoded video image data for the frame; and feeding back encoding information for the frame for use when processing the video image data of the next frame in the sequence of frames in the bitstream;

wherein:

the feeding back of the encoding information for the frame comprises:

feeding back for each block of data that the video frame has been divided into for encoding purposes, at least an encoding indicator; wherein:

the feeding back of an encoding indicator for a block of the frame comprises:

when the encoding indicators for the blocks of the frame were disabled when processing the video image data for the frame, feeding back an encoding indicator derived for a previous frame in the sequence of video frames for the block of the frame.

In another embodiment technology described herein comprises an apparatus for encoding frames of a sequence of frames of video data that is provided as a bitstream of video image data representing the sequence of frames of video data, the apparatus comprising:

processing circuitry configured to receive a bitstream of video image data;

analysis processing circuitry configured to, for a frame that a bitstream of video image data represents:

process the video image data for the frame to divide the video frame into blocks for encoding purposes, and to derive for each block that the video frame has been divided into for encoding purposes, a set of encoding information;

and provide the encoding information derived for the video image data for the frame for use to encode the video image data for the frame to provide output encoded video image data for the frame;

and feedback circuitry configured to feed back, to the analysis processing circuitry, encoding information for a frame for use when processing the video image data of a next frame in a sequence of frames in a received bitstream;

wherein:

the feedback circuitry is configured to feed back the encoding information for a frame by:

feeding back for each block of data that a video frame has been divided into for encoding purposes, at least an encoding indicator:

and to:

feed back an encoding indicator for a block of a frame by:

when the encoding indicators for the blocks of the frame were disabled when processing the video image data for a frame, feeding back an encoding indicator derived for a previous frame in a sequence of video frames for the block of the frame.

As will be appreciated by those skilled in the art, these embodiments of the technology described herein may include any one or more or all of the optional features of the technology described herein discussed herein, as appropriate.

In particular, in an embodiment, the encoding process correspondingly includes optional features discussed above in relation to the decoding process. Thus, in an embodiment for example, when the encoding indicators were enabled when processing the video image data for a frame and the encoding indicators were updated for the frame (and thus, in an embodiment, the processing of the video image data for a frame included deriving an encoding indicator for each block of the frame, e.g. with at least two encoding indicators for at least two respective blocks having different values), the feeding back of an encoding indicator for a block of the frame comprises feeding back the derived encoding indicator for the block of the frame.

Furthermore, in an embodiment, when encoding indicators were enabled when processing the video image data for a frame and the encoding indicators refer to the encoding indicators from a previous frame, the feeding back of an encoding indicator for a block of the frame comprises feeding back an encoding indicator derived for a previous frame in a sequence of video frames for the block of the frame.

Also, for example, the set of encoding information that is derived for a frame to be encoded is, in an embodiment, of the form discussed above.

Correspondingly, in an embodiment the set of encoding information, e.g. the motion vector values, the block size indicators and/or the encoding indicators, is fed back and/or provided for use to encode the video image data in a single stream of data.

Similarly, as for the decoding method and apparatus, in one embodiment the encoding apparatus comprises storage that may be used for storing the encoding information derived for the video image data for the frame (and any additional encoding information) for use to encode the video image data for the frame.

Similarly, in an embodiment the encoding indicators that are fed back for use when encoding the next frame in the sequence of frames include any finer resolution encoding indicator information (as discussed above with respect to the decoding process) that may be present from a previous frame that has been encoded, e.g., in the same manner as is discussed above with respect to the decoding method and apparatus.

The processing of the video image data to derive a set of encoding information for each block of the frame can comprise any desired and suitable such processing. In an embodiment, it comprises performing motion estimation for the video image data for the frame with respect to a reference frame to derive for each block that the video frame has been divided into for encoding purposes, a motion vector value for the block.

Correspondingly, in an embodiment the analysis processing circuitry preferably motion estimate circuitry configured to, for a frame of video image data to be encoded: perform motion estimation for the video image data for the frame with respect to a reference frame to derive for each block that the video frame has been divided into for encoding purposes, a motion vector value for the block.

The reference frame that is used to perform the motion estimation relative to the frames of input video image data being encoded may comprise any suitable and desired frame of video image data. For example the reference frame may be the same, e.g. static, frame for all of (or at least a plurality of) the frames of video image data to be encoded. In an embodiment the reference frame comprises a previous frame in the sequence of frames of video image data.

Once the set of encoding information has been generated from the input video image data for the current frame, in an embodiment the encoding information (e.g. the motion vector values, the block size indicators and/or the encoding indicators) for the plurality of blocks of data in the current and previous frames are provided, e.g. to encoding processing circuitry, for use to encode the video image data for the current frame. In an embodiment the encoding process comprises an entropy or differential encoder. In an embodiment the encoded video image data for the sequence of frames of video image data is then output, e.g., as an encoded stream of video image data, e.g. to storage and/or for transmission.

In an embodiment the processing circuitry (e.g. including the parsing circuitry, the feedback circuitry, the analysis circuitry, the motion estimation circuitry, the encoding circuitry and/or the decoding circuitry) may be in communication with one or more memories and/or memory devices that store the data described herein, and/or that store software for performing the processes described herein. The processing circuitry may also be in communication with a host microprocessor, and/or with a display for displaying images based on the data described above, or a video processor for processing the data described above.

The technology described herein can be implemented in any suitable video processing system, such as a suitably configured micro-processor based system. In an embodiment, the technology described herein is implemented in a computer and/or micro-processor based system. In an embodiment, the technology described herein is implemented in (or as) a video decoder, encoder and/or processor.

The system can include any suitable and desired components or elements to allow the operation in the manner of the technology described herein, such as, for example, a rendering unit (to which the output (decoded) video image data is provided, e.g. from the decoding processing circuitry) for rendering, an output, e.g. a display, to which the rendered frames of video are provided from the rendering unit, and memory for storing the data that is required (such as the unencoded video data, the consequent encoded data blocks and the consequent output (decoded) video data).

When the encoded video image data has been produced (e.g. as a bitstream of the encoded data), it can then be handled as desired for future use, e.g. by being suitably stored and/or by being transmitted to a decoder for decoding (which is, in an embodiment, the apparatus for decoding encoded video image data of the technology described herein). The decoder can then subsequently decode the encoded video data, e.g. using the decoding method of the technology described herein.

The various functions of the technology described herein may be carried out in any desired and suitable manner. For example, the functions of the technology described herein can be implemented in hardware or software, as desired. Thus, for example, unless otherwise indicated, the various functional elements and stages of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., when desired.

Subject to any hardware necessary to carry out the specific functions discussed above, the video processor can otherwise include any one or more or all of the usual functional units, etc., that video encoders, decoders, and processors include.

It will also be appreciated by those skilled in the art that all of the described embodiments of the technology described herein can, and in an embodiment do, include, as appropriate, any one or more or all of the features described herein.

The methods of the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Embodiments of the technology described herein will now be described in the context of encoding and decoding video image data according to the VP9 encoding format.

In the VP9 encoding scheme, each frame of video image data is divided into a plurality of rectangular blocks of pixels of the frame, with each block being encoded and decoded individually. A given block of data may have an associated motion vector that points to a corresponding block of data in a reference frame, and a residual that describes the differences between the data in the current data block and the data in the reference frame.

In VP9 encoding, a block of a video frame may be encoded in a number of different ways, according, inter alia, to the values set for the block for a set of variable encoding parameters that are defined for the VP9 encoding format. The set of encoding parameters comprises a skip indication, a quantisation parameter, a loop filter strength and a reference frame indicator. The set of values to be used for (and used for) the set of encoding parameters for a block are indicated by an encoding indicator for the block, called the "segment ID". Where used for a frame, a segment ID is provided for each block of data being encoded, and the set of segment IDs for a frame together form a so-called "segment map" for the frame in question.

Eight different segment IDs are permitted, with each different segment ID indicating a particular set of values for the encoding parameters for the video frame block in question. However, some frames may be encoded without reference to encoding parameters for the frame in question, i.e. the encoding indicators are disabled when encoding the video image data for these frames. For such frames, a segment ID of 0 (one of the eight different values that the segment IDs may take) is assigned as a default value for the segment ID for each block of the frame, to indicate that the frame was encoded with the encoding indicators disabled.

Furthermore, in VP9 encoding, for any given frame, one of a number of encoding or decoding modes can be applied, that determine whether or not the video image data for the frame is encoded or decoded using a set of encoding indicators (i.e. the encoding indicators are enabled and thus a new set of encoding indicators (i.e. a segment map) is generated (when encoding) or provided (when decoding) for the frame in question), or whether the encoding indicators (the segment map) for a previous frame are to be used for the frame in question), or whether the video image data for the frame is encoded or decoded without using a set of encoding indicators (i.e. the encoding indicators are disabled and thus a default set of encoding indicators (no segment map) are to be generated/provided for the frame in question (i.e. the segment map is disabled for the frame)).

The encoding or decoding mode is indicated in the frame "header" of each frame as part of the bitstream of encoded video image data.

The decoding of a bitstream of a sequence of frames of VP9 encoded video data will be described first, with reference to FIGS. 1 and 2.

Figure 3:
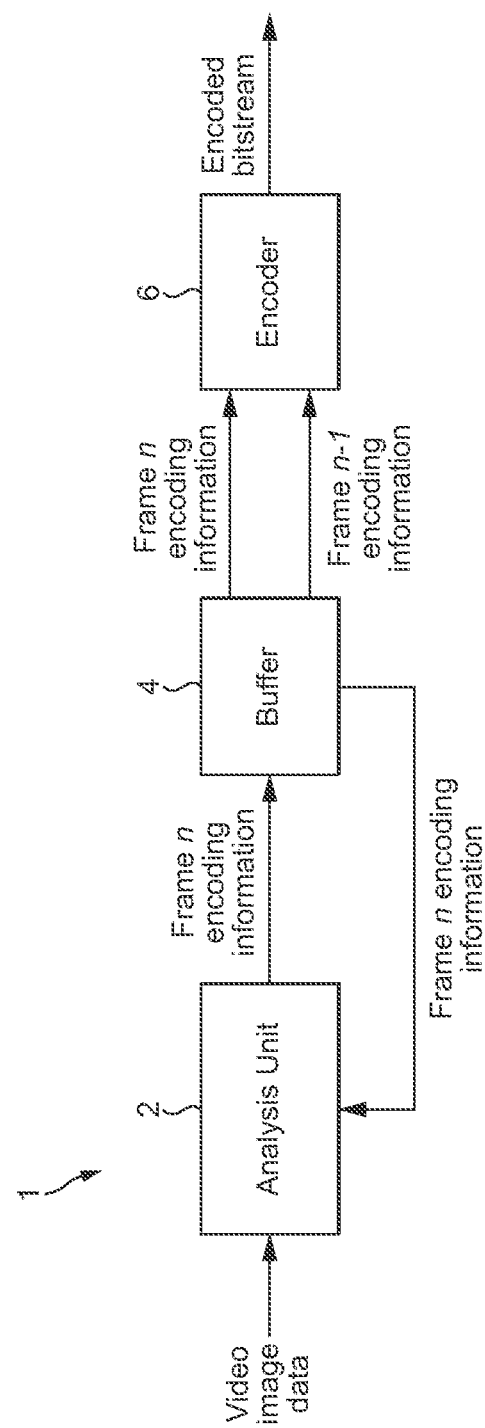
FIG. 3 shows a schematic of an apparatus for encoding video image data to which the technology described herein can be applied.

FIG. 1 shows a schematic of an apparatus 101 for decoding encoded video image data, e.g. encoded as described using the apparatus shown in FIG. 3, using an embodiment of the technology described herein.

The apparatus 101 comprises a parsing unit 102 that receives a bitstream of encoded video image data to be decoded, the bitstream comprising encoded video image data for a sequence of multiple frames. The apparatus 101 also comprises a buffer 104 that receives a set of encoding information from the parsing unit 102 for each frame. The buffer 104 is also arranged to feed back the sets of encoding information for the frames to the parsing unit 102.

The apparatus 101 further comprises a rendering unit 106 that receives the sets of encoding information for each frame from the buffer 104. Finally, the apparatus 101 comprises a frame buffer 108 that receives the decoded video image data (typically in a YUV format) for each frame from the rendering unit 106 such that it can be displayed.

Operation of the apparatus 101 for decoding encoded video image data in this embodiment will now be described with reference to FIG. 1.

In operation, the parsing unit 102 receives a stream of encoded video image data that represents a sequence of video frames. The parsing unit 102 reads the encoded video image data for a given frame n of the sequence and from it generates a set of encoding information for use for subsequent decoding and rendering of the video image data for the frame n. The set of encoding information includes motion vectors, block sizes and encoding indicators (where present in the encoded video image data for the frame in question).

The set of encoding information for frame n is written into the buffer 104 (provided in the main memory (e.g. in direct random-access memory (DRAM))), for temporary storage. The set of encoding information for frame n is then provided to the rendering unit 106 which generates YUV image data using the set of encoding information for the frame n. This YUV image data for the frame n is then sent to a frame buffer 108, e.g. for display.

As shown in FIG. 1, the set of encoding information for frame n is also fed back to the parsing unit 102 from the buffer 104, to enable the parsing unit 102 to generate the encoding information for the next frame, frame n+1.

The set of encoding information is fed back to the parsing unit 102 as a single stream of data, in the form of a sequence of data words each containing respective encoding information for blocks of the frame. There is at least one data word for each block that the frame has been divided into, with some blocks potentially having additional data words (as will be discussed further below).

As will be discussed further below, the encoding information that is derived for a given encoded frame, and the encoding information that is fed back to the parsing unit for the frame, will include for each block that the frame has been divided into for encoding purposes, one or more of: a block size indication, a motion vector value and an encoding indicator (segment ID) for the block. Which of these values is derived for a block by the parsing unit, and is provided for the block, will depend, inter alia, upon what information is encoded in the encoded bitstream for the block in question. This operation will be discussed in more detail below.

Each piece of information for a block of data within a frame, e.g. including the block size, the segment ID and the motion vector, is reserved a fixed number of bits within an initial, e.g. 32 bit, data word for each block.

In the technology described herein, the set of encoding information for a frame that is fed back from the buffer 104 to the parsing unit 102 for use to generate the set of encoding information for the next frame n+1 always includes a set of encoding indicators (a "segment map") for the frame of video image data. This allows a set of encoding indicators (a "segment map") to be provided for each frame of video image data, even when encoding indicators for the blocks of encoded image data are not provided in the bitstream (which, as discussed above, may sometimes be the case, depending on the mode used to encode the video image data).

The set of encoding indicators (the segment map) that is fed back for a frame to the parsing unit 102 depends upon whether the frame currently being decoded was encoded using encoding parameters (and thus included a non-default segment map). This (encoding or decoding mode) is indicated in the frame "header" of each frame as part of the bitstream of encoded video image data.

When the frame of encoded video image data being decoded was encoded with an updated segment map enabled and thus the encoded video image data includes a (non-default) segment map (i.e. containing at least two different segment IDs), the parsing unit 102 parses the encoded data and generates the set of encoding information including the segment map for the frame to be provided to the buffer 104 and to be fed back to the parsing unit 102.

When the frame of encoded video image data being decoded has its segment map disabled (i.e. such that the encoded data included a default segment map), the segment map for a previous frame in the sequence of frames is fed back to the parsing unit 102. To do this the parsing unit 102 parses the data for the current frame to generate the set of encoding information for the current frame, and then includes with that encoding information the segment map for the previous frame (which has been fed back to the parsing unit 102 from the buffer 104 so that it is available for this purpose) in the encoding information that is provided to the buffer 104.

As the encoding information fed back to the parsing unit 102 for the previous frame includes a segment map from a previous frame, this ensures that a segment map from a previous frame will always be available for a frame of encoded video image data that refers to the segment map in a previous frame.

Figure 2:
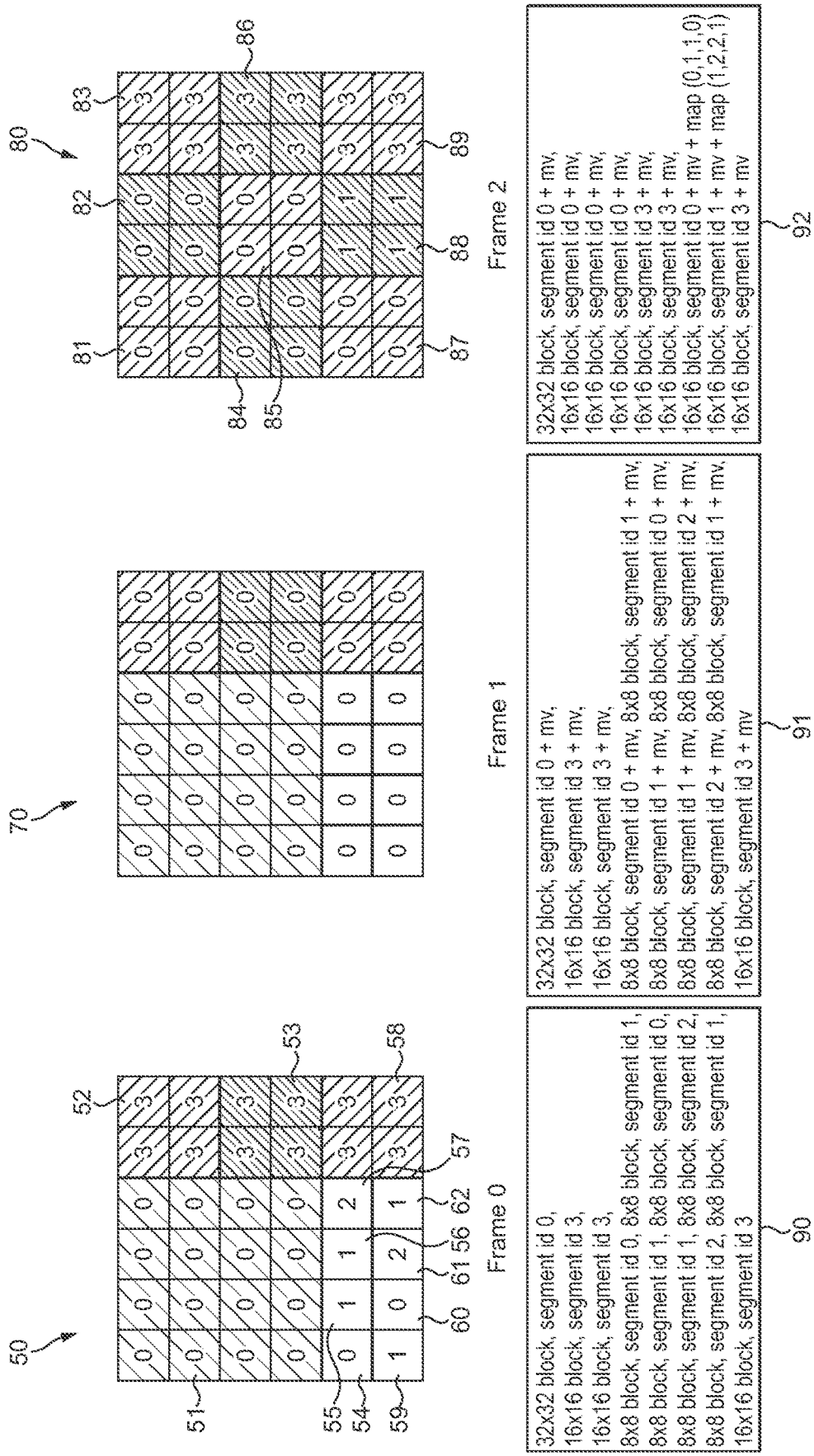
FIG. 2 shows examples of segment maps containing encoding indicators to be used in the encoding and decoding of video image data in the apparatus shown in FIGS. 1 and 3.

FIG. 2 shows examples of the fed back encoding information data stream, including the segment IDs (encoding indicators), for an exemplary sequence of video frames when decoding video image data using the apparatus shown in FIG. 1.

FIG. 2 shows three exemplary frames 50, 70, 80 (frame 0, frame 1, frame 2) of video image data, along with the encoding information data 90, 91, 92 that is fed back for use when parsing the next frame in the sequence for the illustrated sequence of frames.

As shown in FIG. 2, each frame is split up into multiple square blocks of data, with the smallest allowed block of data being 8×8 pixels. Each block also has an associated segment ID (encoding indicator).

In raster scan order, frame 0 includes a 32×32 block 51 with an encoding indicator (segment ID) of 0, a 16×16 block 52 with an encoding indicator of 3, another 16×16 block 53 with an encoding indicator of 3, an 8×8 block 54 with an encoding indicator of 0, an 8×8 block 55 with an encoding indicator of 1, another 8×8 block 56 with an encoding indicator of 1, an 8×8 block 57 with an encoding indicator of 2, a 16×16 block 58 with an encoding indicator of 3, an 8×8 block 59 with an encoding indicator of 1, an 8×8 block 60 with an encoding indicator of 0, an 8×8 block 61 with an encoding indicator of 2, an 8×8 block 62 with an encoding indicator of 1.

(The size of the frames shown in FIG. 2 is limited for the purposes of explanation only; in reality the frames of video image data are likely to be much larger. Furthermore, the encoding indicators (segment IDs) have been limited to values between 0 and 3; in VP9 the encoding indicators (segment IDs) run from 0 to 7.)

As the first frame 50, frame 0 (which was encoded with an updated segment map enabled), includes segment IDs for each block of the frame (and at least two different segment IDs for the blocks of the frame 50), the data stream 90 that is fed back for this first frame, frame 0, comprises, for each block in the frame, a block size indication and the segment ID for the block. Thus, as shown in FIG. 2, the data stream that is fed back to the parsing unit 102 for this frame comprises a stream of data words containing the following encoding information:

32×32 block, segment id 0, 16×16 block, segment id 3, 16×16 block, segment id 3, 8×8 block, segment id 0, 8×8 block, segment id 1, 8×8 block, segment id 1, 8×8 block, segment id 0, 8×8 block, segment id 1, 8×8 block, segment id 2, 8×8 block, segment id 2, 8×8 block, segment id 1, 16×16 block, segment id 3

As shown in FIG. 2, the next frame 70 in the sequence, frame 1, has the segment map feature disabled, i.e. a default set of segment IDs (encoding indicators) are carried in the bitstream of the encoded video image data for this frame, and thus a default value of 0 is set for the encoding indicator (segment ID) for each block in frame 1. However, the block sizes from frame 0 are retained in frame 1

It is also assumed in this example that for each block in frame 1 a motion vector (mv) value is provided, that references a corresponding block of pixels in the first frame in the sequence, frame 0 (which will accordingly act as a reference frame for the sequence of video frames). (Motion vectors are not supplied for frame 0 owing to it being the first frame in the sequence of (a group of) frames and thus frame 0 is able to be decoded independently without reference to another frame (i.e. frame 0 is an "intra" or "key" frame).)

In this case therefore the data 91 in the data stream that is fed back to the parsing unit 102 as the encoding information from frame 1 comprises for each block of frame 1, a block size indication and a motion vector value, as shown in FIG. 2.

However, as also shown in FIG. 2, in addition to these values that are derived from the encoded video data for frame 1, the segment ID from the corresponding block in frame 0 is additionally fed back for the corresponding block in frame 1 (thus the segment map information for frame 0 is supplied in the set of encoding information for frame 1).

Thus, as shown in FIG. 2, the data stream that is fed back to the parsing unit 102 for frame 1 comprises the following information:

32×32 block, segment id 0+mv, 16×16 block, segment id 3+mv, 16×16 block, segment id 3+mv, 8×8 block, segment id 0+mv, 8×8 block, segment id 1+mv, 8×8 block, segment id 1+mv, 8×8 block, segment id 0+mv, 8×8 block, segment id 1+mv, 8×8 block, segment id 2+mv, 8×8 block, segment id 2+mv, 8×8 block, segment id 1+mv, 16×16 block, segment id 3+mv As can be seen, the segment IDs fed back for frame 1 are the same as those provided for frame 0, but the fed back encoding information for frame 1 also includes the motion vector values which are representative of the movement of the blocks of pixels between frames 0 and 1. Although the segment IDs fed back for frame 1 are the same as those provided for frame 0, the default set of segment IDs (equal to 0 for all the blocks in the frame) are provided to the decoding stage, to indicate that the blocks of the frame were encoded without the use of segment IDs (and therefore also encoding parameters) and thus do not require any segment IDs (and their associated encoding parameters) to decode the encoded video image data for the frame.

It is then assumed that the next frame 80 in the sequence, frame 2, is set to an encoding mode where it is to use a previous segment map in the sequence of frames (which in this case will be the segment map for the first frame, frame 0). However, as can be seen, the block sizes in frame 2 have changed from those in frames 0 and 1.

In this case therefore, for each block in frame 2, the minimum of the segment IDs (encoding indicators) for the blocks in the frame whose segment map is to be used (thus for frame 0) is selected as the encoding indicator to use for the block in frame 2.

Thus, as shown in FIG. 2, in raster scan order, frame 2 includes a 16×16 block 81 whose encoding indicator (segment ID) is set to 0, another 16×16 block 82 whose encoding indicator is set to 0, a 16×16 block 83 whose encoding indicator is set to 3, a 16×16 block 84 whose encoding indicator is set to 0, another 16×16 block 85 whose encoding indicator is set to 0, a 16×16 block 86 whose encoding indicator is set to 3, a 16×16 block 87 whose encoding indicator is set to 0, a 16×16 block 88 whose encoding indicator is set to 1, and a 16×16 block 89 whose encoding indicator is set to 3.

It is also assumed in this example that for each block in frame 2 a motion vector (mv) value is provided, that references a corresponding block of pixels in the second frame 70 in the sequence, frame 1.

In this case therefore the data 92 in the data stream that is fed back to the parsing unit 102 as the encoding information from frame 2 comprises for each block of frame 2, a block size indication and a motion vector value, as shown in FIG. 2.

However, as also shown in FIG. 2, in addition to these values that are derived from the encoded video data for frame 2, the segment ID selected from the corresponding block(s) in frame 0 is additionally fed back for the corresponding block in frame 2.

In addition to this, as shown in FIG. 2, where a block in frame 2 encompasses plural blocks in the previous frame, frame 0, from which the encoding indicators (segment IDs) are being taken, the data stream that is fed back for frame 2 additionally includes the encoding indicators for the blocks having the finer resolution from the previous frame (frame 0 in this case) that the segment IDs (segment map) are being taken from.

Thus, for example, for the 16×16 block 87 of frame 2 having a segment ID of 0, the segment IDs for the corresponding four 8×8 blocks 54, 55, 59, 60 from frame 0 that form the 16×16 block 87 in frame 2 are also provided in the fed back set of encoding information for frame 2 (as "map (0,1,1,0)"). Similarly, for the 16×16 block 88 having a segment ID of 1, the segment IDs for the corresponding four 8×8 blocks 56, 57, 61, 62 from frame 0 are also provided in the fed back set of encoding information for frame 2 (as "map (1,2,2,1)"). This then allows a subsequent frame, which has corresponding blocks at this finer resolution to use these finer resolution encoding indicators.

Thus, as shown in FIG. 2, the data stream that is fed back to the parsing unit 102 for frame 2 comprises the following information:

16×16 block, segment id 0+mv, 16×16 block, segment id 0+mv, 16×16 block, segment id 0+mv, 16×16 block, segment id 0+mv, 16×16 block, segment id 3+mv, 16×16 block, segment id 3+mv, 16×16 block, segment id 0+mv+map (0,1,1,0), 16×16 block, segment id 1+mv+map (1,2,2,1), 16×16 block, segment id 3+mv The additional, finer resolution segment ID information for a block is conveyed in the data stream by including one or more additional data words in the data stream for the block in question. Although not shown in this example, if the finer resolution segment ID information for number of blocks all had the same segment ID value, it may not be necessary to carry the finer resolution segment ID information in the data stream, e.g. the data stream may only include the segment ID once for all the blocks having the same segment ID value.

The presence of these additional data word(s) is indicated by setting a flag in the initial data word in the data stream for the block in question (which initial data word will also include, inter alia, the block size indication, motion vector value (if any) and segment ID to be used for the block).

In the present embodiment, assuming the use of 32 bit data words, a minimum block size of 8×8 pixels and segment ID values of 0-7, the use of additional data words in the data stream is configured as follows.

If the current block's size is smaller than 32×32 pixels then the block contains at most eight 8×8 pixel blocks and so a single additional data word configured as follows is used:

| 31 | 30 29 28 | 27 | 26 25 24 | 23 | 22 21 20 | 19 | 18 17 16 | 15 | 14 13 12 | 11 | 10 9 8 | 7 | 6 5 4 | 3 | 2 1 0 |
|---|---|---|---|---|---|---|---|---|---|---|---|---|---|---|---|
| 0 | seg[7] | 0 | seg[6] | 0 | seg[5] | 0 | seg[4] | 0 | seg[3] | 0 | seg[2] | 0 | seg[1] | 0 | seg[0] |

The seg[k] value is the segment ID for 8×8 pixel block k in raster scan order within the current block.

If the current block's size is 32×32 pixels or above, then an additional header data word with 4 bits for each 32×16 pixel block in raster scan order within the current block followed by up to eight additional data words is used, as follows:

| 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|
| hdr[7] | hdr[6] | hdr[5] | hdr[4] | hdr[3] | hdr[2] | hdr[1] | hdr[0] |
| | | | Ext[0] | | | | |
| | | | Ext[1] | | | | |
| | | | Ext[2] | | | | |
| | | | Ext[3] | | | | |
| | | | Ext[4] | | | | |

Ext[5]
Ext[6]
Ext[7]

If hdr[k] in the header data word is in the range 0-7 then all the sub-blocks of the 32×16 pixel block number k have that segment ID.

On the other hand, when hdr[k] is equal to 8 then the 32×16 pixel block number k has different segment ID's within it. In this case a further additional data word Ext[k] configured as shown above for less than 32×32 pixel block sizes is used to give the segment map for the eight 8×8 pixel blocks contained in the 32×16 pixel block in question.

Other arrangements would, of course, be possible.

The encoding of a sequence of frames of video image data, in an embodiment of the technology described herein, will now be described with reference to FIG. 3. The encoding process basically operates in a corresponding manner to the decoding process described above.

FIG. 3 shows a schematic of an apparatus 1 for encoding video image data in an embodiment of the technology described herein.

The apparatus 1 comprises an analysis unit 2 that receives a bitstream of video image data to be encoded, the bitstream comprising a sequence of multiple frames of video image data. The apparatus 1 also comprises a buffer 4 (in main memory) that receives a set of encoding information from the analysis unit 2 for each frame. The buffer 4 is also arranged to feed back the sets of encoding information for the frames to the analysis unit 2. Finally, the apparatus 1 comprises an encoder 6 that receives sets of encoding information from the buffer for a current frame and the previous frame, and outputs an encoded bitstream of encoded video image data.

Operation of the apparatus 1 for encoding video image data in this embodiment will now be described with reference to FIG. 3.

In operation, the analysis unit 2 receives a stream of video image data that includes successive frames of video data. The analysis unit 2 analyses the video image data in the frames, divides the frames into blocks for encoding purposes, and generates a set of encoding information for subsequent encoding of the video image data for each block of each frame. This analysis includes performing motion estimation for the blocks of the frame, for example.

The set of encoding information that is generated for a block of a frame by the analysis unit 2 includes one or more of motion vectors, block sizes and encoding indicators.

The set of encoding information for frame n is written into the buffer 4, for temporary storage. At this time, the buffer 4 also contains the set of encoding information for frame n−1. The sets of encoding information for frames n−1 and n are then forwarded to the encoder 6, which uses this data to encode the frame n according to the VP9 standard.

An encoded bitstream, i.e. the stream of encoded video image data for a sequence of frames, is output from the encoder 6, e.g. for transmission.

As shown in FIG. 3, the set of encoding information for frame n is also fed back to the analysis unit 2 from the buffer 4, for use by the analysis unit 2 when generating the encoding information for the next frame, frame n+1.

As in the decoding case discussed above, the set of encoding information is fed back to the analysis unit 2 as a single stream of data, in the form of a sequence of data words each containing respective encoding information for blocks of the frame. There is at least one data word for each block that the frame has been divided into, with some blocks potentially having additional data words (as discussed above). The encoding information is fed back using the format discussed above for the decoding operation.

The encoding information that is derived for a given frame, and the encoding information that is fed back to the analysis unit for a frame, will include for each block that the frame has been divided into for encoding purposes, one or more of: a block size indication, a motion vector value and an encoding indicator (segment ID) for the block. Which of these values is derived for a block by the analysis unit, and is provided for the block, will depend, inter alia, upon how the analysis unit 2 decides to encode the block in question.

In the technology described herein, the set of encoding information for a frame that is fed back from the buffer 4 to the analysis unit 2 for use when generating the set of encoding information for the next frame n+1 always includes a set of encoding indicators (a "segment map") for the frame of video image data. This allows a set of encoding indicators (a "segment map") to be provided for each frame of video image data, even when encoding indicators were disabled for the blocks of the frame in question when encoding the frame of video image data (and thus a default set of encoding indicators were encoded).

The set of encoding indicators (the segment map) that is fed back for a frame to the analysis unit 2 depends upon whether a (non-default) segment map was generated for the frame currently being encoded or not, i.e. whether the encoding indicators were disabled for the blocks of the frame in question or not, and whether or not the segment map for the previous frame is referred to for the frame currently being encoded, e.g. whether or not an updated segment map is provided for the purposes of encoding.

When an, e.g. updated, segment map is generated for the current frame, that segment map is fed back to the analysis unit 102.

When the encoding indicators are disabled and a default segment map is generated for the current frame, the segment map for a previous frame in the sequence of frames is fed back to the analysis unit 2. To do this the analysis unit 2 includes with the set of encoding information that it generates for the current frame, the segment map for the previous frame (which has been fed back to the analysis unit 2 from the buffer 4 so that it is available for this purpose) in the encoding information that is provided to the buffer 4.

When segment map for the previous frame is referred to for the frame currently being encoded, the segment map for a previous frame in the sequence of frames is fed back to the analysis unit 2. To do this the analysis unit 2 includes with the set of encoding information that it generates for the current frame, the segment map for the previous frame (which has been fed back to the analysis unit 2 from the buffer 4 so that it is available for this purpose) in the encoding information that is provided to the buffer 4.

It can be seen from the above that the method and apparatus of the technology described herein feed back encoding indicators (segment IDs) for each frame to be available at the parsing/analysis stage. This helps to ensure that even where encoding indicators (segment IDs) may not be present as part of the encoded video image data for a frame, a set of encoding indicators for the blocks of a frame are available for use when needed, regardless of the presence or otherwise of encoding indicators in the encoded video image data for a frame.

The foregoing detailed description has been presented for the purposes of illustration and description. It is not intended to be exhaustive or to limit the technology described herein to the precise form disclosed. Many modifications and variations are possible in light of the above teaching. The described embodiments were chosen in order to best explain the principles of the technology, and its practical application, to thereby enable others skilled in the art to best utilise the technology, in various embodiments and with various modifications as are suited to the particular use contemplated. It is intended that the scope be defined by the claims appended hereto.

What is claimed is:

1. A method of decoding frames of a sequence of frames of video data, the sequence of frames of video data being provided as a bitstream of encoded video image data representing the sequence of frames of video data, the method comprising, for a current frame that the bitstream of encoded video image data represents:
   parsing the encoded video image data for the current frame to derive for each block that the current frame has been divided into for encoding purposes, a set of encoding information;
   providing the encoding information derived from the encoded video image data for the current frame for use to decode the encoded video image data for the current frame to provide output video image data for the current frame; and
   feeding back encoding information from the set of encoding information derived for the current frame for use when parsing the encoded video image data of a next frame in the sequence of frames encoded in the bitstream;
   wherein the feeding back of the encoding information derived for the current frame comprises feeding back for each block of data that the current frame has been divided into for encoding purposes, at least an encoding indicator;
   wherein the feeding back of the encoding indicator for a block of the current frame comprises, when the encoding indicators for the blocks of the current frame were disabled when encoding the video image data for the current frame, feeding back the encoding indicator derived from the encoded video image data for a previous frame in the sequence of frames for the block of the current frame to use when parsing the encoded video image data of the next frame in a sequence of frames encoded in the bitstream.

2. A method as claimed in claim 1, wherein the feeding back of the encoding indicator for a block of the current frame comprises:
   when the encoding indicators were enabled when encoding the video image data for the blocks of the current frame and the set of encoding indicators was updated for the current frame, feeding back the encoding indicator for the block of the current frame that was derived from the encoded video image data for the current frame.

3. A method as claimed in claim 1, comprising:
   when the encoding indicators were enabled when encoding the video image data for the current frame and these encoding indicators were encoded with the encoded video image data, providing that set of encoding indicators in, and feeding that set of encoding indicators back for, the encoding information for the next and any subsequent frames in the sequence of frames encoded in the bitstream, until a new frame having encoding indicators enabled when encoding the video image data for the new frame and having these encoding indicators encoded with the encoded video image data appears in the sequence of frames.

4. A method as claimed in claim 1, wherein the set of encoding information that is derived for each block of the current frame comprises a block size indication for the block.

5. A method as claimed in claim 1, wherein the set of encoding information that is derived for each block of the current frame comprises a motion vector value for the block.

6. A method as claimed in claim 1, wherein the encoding information that is fed back for use when parsing the encoded video image data of the next frame is fed back in a single stream of data.

7. A method as claimed in claim 1, wherein the encoding information that is fed back for use when parsing the encoded video image data of the next frame is fed back as a stream of fixed size data words into which the encoding information is written.

8. A method as claimed in claim 1, comprising:
   when the encoding indicators derived from the encoded video image data of the previous frame of the sequence of frames are to be fed back for the blocks of the current frame, for each block of the current frame selecting a single encoding indicator value from the previous frame in the sequence of frames as the encoding indicator to be fed back for the block.

9. A method as claimed in claim 1, comprising:
   when the encoding indicators derived from the encoded video image data of the previous frame of the sequence of frames are to be fed back for the blocks of the current frame, and a block of data in the current frame corresponds to a plurality of blocks of data in the previous frame from which the encoding indicators are being taken, feeding back the plurality of encoding indicators for the plurality of blocks of data in the previous frame from which the encoding indicators are being taken in respect of the block of data in the current frame.

10. A method as claimed in claim 1, wherein when the encoding indicators derived from the encoded video image data of the previous frame of the sequence of frames are to be fed back for the blocks of a current frame for each block of the current frame and when a block of data in the current frame corresponds to a plurality of blocks of data in the previous frame from which the encoding indicators are being taken, the encoding indicator information provided for the block of data in the current frame comprises both a single value representative of the encoding indicators for the corresponding blocks of data in the previous frame from which the encoding indicators are being taken, and the plurality of encoding indicators for the plurality of blocks of data in the previous frame from which the encoding indicators are being taken that correspond to the block of data in the current frame.

11. A method as claimed in claim 9, further comprising including in the fed back encoding information an indication that the fed back encoding information includes additional encoding indicator information for the block of data in the current frame.

12. An apparatus for decoding frames of a sequence of frames of video data that is provided as a bitstream of encoded video image data representing the sequence of frames of video data, the apparatus comprising:
- processing circuitry that receives a bitstream of encoded video image data;
- parsing processing circuitry that, for a current frame that a bitstream of encoded video image data represents:
  - parses the encoded video image data for the current frame to derive for each block that the current frame has been divided into for encoding purposes, a set of encoding information; and
  - provides the encoding information derived from the encoded video image data for the current frame for use to decode the encoded video image data for the current frame to provide output video image data for the current frame; and
- feedback circuitry that feeds back, to the parsing processing circuitry, encoding information from the set of encoding information derived for the current frame for use when parsing the encoded video image data of a next frame in a sequence of frames encoded in a received bitstream;
- wherein the feedback circuitry feeds back the encoding information derived for the current frame by feeding back for each block of data that the current frame has been divided into for encoding purposes, at least an encoding indicator; and
- wherein the feedback circuitry feeds back the encoding indicator for a block of a current frame by, when the encoding indicators for the blocks of the current frame were disabled when encoding the video image data for the current frame, feeding back the encoding indicator derived from the encoded video image data for a previous frame in a sequence of video frames for the block of the current frame to use when parsing the encoded video image data of the next frame in the sequence of frames encoded in the bitstream.

13. An apparatus as claimed in claim 12, wherein the feedback circuitry feeds back the encoding indicator for a block of the current frame by:
- when the encoding indicators were enabled when encoding the video image data for the blocks of the current frame and the set of encoding indicators was updated for the current frame, feeding back the encoding indicator for the block of the current frame that was derived from the encoded video image data for the current frame.

14. An apparatus as claimed in claim 12, wherein the parsing processing circuitry provides the encoding information for the current frame by, when the encoding indicators were enabled when encoding the video image data for the current frame and these encoding indicators were encoded with the encoded video image data, providing that set of encoding indicators in the encoding information for the next and any subsequent frames in the sequence of frames encoded in the bitstream, until a new frame having encoding indicators enabled when encoding the video image data for the new frame and having these encoding indicators encoded with the encoded video image data appears in the sequence of frames; and
- wherein the feedback circuitry feeds back the encoding information for the current frame by feeding that set of encoding indicators back for the encoding information for the next and any subsequent frames in the sequence of frames encoded in the bitstream, until the new frame having encoding indicators enabled when encoding the video image data for the new frame and having these encoding indicators encoded with the encoded video image data appears in the sequence of frames.

15. An apparatus as claimed in claim 12, wherein the set of encoding information that is derived for each block of the current frame comprises a block size indication for the block.

16. An apparatus as claimed in claim 12, wherein the set of encoding information that is derived for each block of the current frame comprises a motion vector value for the block.

17. An apparatus as claimed in claim 12, wherein the feedback circuitry feeds back the encoding information to be fed back in a single stream of data.

18. An apparatus as claimed in claim 12, wherein the feedback circuitry feeds back the encoding information, for use when parsing the encoded video image data of the next frame, as a stream of fixed size data words into which the encoding information is written.

19. An apparatus as claimed in claim 12, wherein the feedback circuitry feeds back the encoding information for a current frame by:
- when the encoding indicators derived from the encoded video image data of the previous frame of the sequence of frames are to be fed back for the blocks the current frame, for each block of the current frame selecting a single encoding indicator value from the previous frame in the sequence of frames as the encoding indicator to be fed back for the block.

20. An apparatus as claimed in claim 12, wherein the feedback circuitry feeds back the encoding information for the current frame by:
- when the encoding indicators derived from the encoded video image data of the previous frame of the sequence of frames are to be fed back for the blocks of the current frame, and a block of data in the current frame corresponds to a plurality of blocks of data in the previous frame from which the encoding indicators are being taken, feeding back the plurality of encoding indicators for the plurality of blocks of data in the previous frame from which the encoding indicators are being taken in respect of the block of data in the current frame.

21. An apparatus as claimed in claim 12, wherein the feedback circuitry feeds back the encoding information for the current frame by:
- when the encoding indicators derived from the encoded video image data of the previous frame of the sequence of frames are to be fed back for the blocks of the current frame for each block of the current frame and when a block of data in the current frame corresponds to a plurality of blocks of data in the previous frame from which the encoding indicators are being taken, the encoding indicator information provided for the block of data in the current frame comprises both a single value representative of the encoding indicators for the corresponding blocks of data in the previous frame from which the encoding indicators are being taken, and the plurality of encoding indicators for the plurality of blocks of data in the previous frame from which the encoding indicators are being taken that correspond to the block of data in the current frame.

22. An apparatus as claimed in claim 20, wherein the feedback circuitry feeds back the encoding information for the current frame by:
- including in the fed back encoding information an indication that the fed back encoding information includes additional encoding indicator information for the block of data in the current frame.

23. A non-transitory computer readable storage medium storing computer software code which when executing on a data processing system performs a method of decoding frames of a sequence of frames of video data, the sequence of frames of video data being provided as a bitstream of encoded video image data representing the sequence of frames of video data, the method comprising, for a current frame that the bitstream of encoded video image data represents:

parsing the encoded video image data for the current frame to derive for each block that the current frame has been divided into for encoding purposes, a set of encoding information;

providing the encoding information derived from the encoded video image data for the current frame for use to decode the encoded video image data for the current frame to provide output video image data for the current frame; and feeding back encoding information from the set of encoding information derived for the current frame for use when parsing the encoded video image data of a next frame in the sequence of frames encoded in the bitstream;

wherein the feeding back of the encoding information derived for the current frame comprises feeding back for each block of data that the current frame has been divided into for encoding purposes, at least an encoding indicator;

wherein the feeding back of the encoding indicator for a block of the current frame comprises, when the encoding indicators for the blocks of the current frame were disabled when encoding the video image data for the current frame, feeding back the encoding indicator derived from the encoded video image data for the previous frame in the sequence of frames for the block of the current frame to use when parsing the encoded video image data of the next frame in the sequence of frames encoded in the bitstream.

* * * * *